(12) United States Patent
Tenorio et al.

(10) Patent No.: US 10,601,080 B2
(45) Date of Patent: Mar. 24, 2020

(54) DEVICES, SYSTEMS, AND METHODS TO MITIGATE THERMAL RUNAWAY CONDITIONS IN MOLTEN FLUID ELECTRODE APPARATUS

(71) Applicant: Vissers Battery Corporation, Wheaton, IL (US)

(72) Inventors: Manoel Tenorio, Brasilia (BR); Daniel R. Vissers, Wheaton, IL (US)

(73) Assignee: Vissers Battery Corporation, Wheaton, IL (US)

( * ) Notice: Subject to any disclaimer, the term of this patent is extended or adjusted under 35 U.S.C. 154(b) by 0 days.

(21) Appl. No.: 15/982,494

(22) Filed: May 17, 2018

(65) Prior Publication Data

US 2019/0356023 A1    Nov. 21, 2019

(51) Int. Cl.
*H01M 4/02* (2006.01)
*H01M 10/39* (2006.01)
*H01M 4/13* (2010.01)
*H01M 10/052* (2010.01)

(52) U.S. Cl.
CPC ......... *H01M 10/3909* (2013.01); *H01M 4/13* (2013.01); *H01M 10/052* (2013.01); *H01M 2004/021* (2013.01)

(58) Field of Classification Search
CPC ..................................................... H01M 4/02
See application file for complete search history.

(56) References Cited

U.S. PATENT DOCUMENTS

| | | |
|---|---|---|
| 3,531,324 A | 9/1970 | Fischer et al. |
| 4,007,315 A | 2/1977 | Brinkmann |
| 4,584,251 A | 4/1986 | Hunziker |
| 4,913,985 A | 4/1990 | Baer |
| 5,070,933 A | 12/1991 | Baer |
| 5,385,793 A | 1/1995 | Tiedemann |
| 5,534,367 A | 7/1996 | Kaun |
| 5,569,552 A | 10/1996 | Rao |
| 5,834,132 A | 11/1998 | Hasegawa |
| 6,329,096 B2 | 12/2001 | Kawakami |

(Continued)

FOREIGN PATENT DOCUMENTS

| | | |
|---|---|---|
| EP | 1723080 B1 | 6/2014 |
| FR | 2934087 | 7/2008 |

(Continued)

OTHER PUBLICATIONS

Electrochemical Power Sources; Primary & Secondary Batteries; Edited by: M Barak Published by: The Institution of Electrical Engineers, London and New York; Peter Peregrinus Ltd., Stevenage, UK, and New York, ISBN 0-906048-26-5, pp. 318-321.

(Continued)

*Primary Examiner* — Jacob B Marks
(74) *Attorney, Agent, or Firm* — Gavrilovich, Dodd & Lindsey, LLP; Charles D. Gavrilovich, Jr.

(57) ABSTRACT

A thermal runaway mitigation system cools fluid electrode material in a thermal battery to prevent a thermal runaway in the thermal battery. In response to a thermal runaway trigger, the thermal runway prevention system cools at least one of the fluid positive electrode material and the fluid negative electrode material. In some situations, the fluid material electrode material is sufficiently cooled to place the electrode material in a solid state.

50 Claims, 13 Drawing Sheets

(56) References Cited

U.S. PATENT DOCUMENTS

| | | | |
|---|---|---|---|
| 6,551,740 | B1 | 4/2003 | Melichar |
| 6,683,002 | B1 | 1/2004 | Chooi et al. |
| 8,404,375 | B2 | 3/2013 | Gaben |
| 2009/0311603 | A1 | 12/2009 | Visco |
| 2010/0104936 | A1 | 4/2010 | Meintschel |
| 2010/0243017 | A1* | 9/2010 | Normann ............ H01M 10/443 136/205 |
| 2010/0330439 | A1 | 12/2010 | Halbert |
| 2012/0003516 | A1 | 1/2012 | Eisenhour |
| 2012/0171524 | A1* | 7/2012 | Hiraiwa ............. H01M 10/399 429/50 |
| 2013/0122331 | A1 | 5/2013 | McDonald |
| 2015/0226806 | A1 | 8/2015 | Kim et al. |
| 2016/0156062 | A1 | 6/2016 | Littau et al. |
| 2016/0365612 | A1 | 12/2016 | Bradwell et al. |
| 2017/0365853 | A1 | 12/2017 | Visco et al. |

FOREIGN PATENT DOCUMENTS

| | | |
|---|---|---|
| FR | 2934087 | 1/2010 |
| JP | 2014229591 | 12/2014 |
| WO | 20170143088 | 8/2017 |
| WO | 2017147713 | 9/2017 |
| WO | 2017152171 | 9/2017 |

OTHER PUBLICATIONS

Molleigh Preefer; MTRL 286G, Spring 2016 "Lithium-Sulfur batteries and discharge products from cycling"; pp. 1-20.

Farday Constant; Wikipedia, https://en.m.wikipedia.org/wiki/Faraday_constant; pp. 1-3.

Kurt J. Lesker Company website; Feedthroughs & Viewports; https://www.lesker.com/newweb/menu_Feedthroughs.cfm?section=liquid&init=skip.

Incell CEO, Stefan Jansson interview; Smart lithium batteries for Telecom industry; https://www.youtube.com/watch?v=FZsiQyqF1rl&feature=youtu.be.

Willmott, A.J. ; http://www.thermopedia.com/content/1832/ Regenerative Heat Exchangers; pp. 1-18.

Recuperator; Wikipedia, https://en.wikipedia.org/Rucuperator, pp. 1-4 https://en.wikipedia.org/wiki/.

https://en.wikipedia.org/Regeneratiave_heat_exchanger, pp. 1-4.

Honeywell, "Dielectric Constant Table", www.honeywellprocess.com/library/marketing/tech-specs/Dielectric%20Constant%20Table_pdf, Jun. 06, 2011, p. 45.

https://www.sensormag.com/components/a-dozen-ways-to-measure-fluid-level-and-how-they-work [finish] Hopper, Henry; A Dozen Ways to Measure Fluid-level and How they Work; Sensors Online; Components; pp. 1-11.

https://en.m.wikipedia.org/wiki/Flow_battery; pp. 1-14.

Dow Data Sheet https://msdssearch.dow.com/PublishedLiteratureDOWCOM-dh_0880/0901b80380880bfe.pdf?filepath=/heattrans/pdfs/noreg/176-01435.pdf&frompage=GetDoc (more . . .) pp. 1-28.

Suberu, Mohammed Yekini, "Energy storage system for renewable energy power sector integration and mitigation of intermittency" Renewable and Sustainable Energy Reviews 35(2014) 499-514; journal homepage: www.elsevier.com/locate/rser.

https://www.hielscher.com/ultrasonically-Homogenizers for Liquid Processing; pp. 1-15.

https://www.hielscher.com/ultrasonically-assisted-catalytic-extraction_htm; pp. 1-8.

http://www.fiberceramics.com/Selee_Corporation_Metal_FoamDetails.php; Selee Ceramic Foam Filters—World leader in foundry metal filtration and advanced ceramic; pp. 1-5.

https://en.m.wikipedia.org/wiki/Plastic_Extrusion; pp. 1-8.

Greebblatt, Martha; Ionic Conductors; ; Rutgers, the State University of New Jersey USA; pp. 1-34.

Material and Process Selection Charts; CES 2010 Edupack; Granta Material Insp; Cambridge University; pp. 1-41.

https://en.m.wiktionary_org/wiki/aliovalent; pp. 1-2.

https://en.m.wikipedia.org/wiki/Crystallographic_defect; pp. 1-7.

https://link.springer.com/article/10.1007/s11581-015-1498-8; Jolley, A., et al.; Improving the ionic conductivity of Nasicon through aliovalent cation substitution of Na3Zr2Si2PO12; Ionics (2015) 21:3031-3038.

Liang, C.C., et al., "A High Energy Density Solid-State Battery System"; J. Electrochem. Soc., Electrochemical Science and Technology; Apr. 1976; pp. 453-458.

Liang, C.C.; "Conduction Characteristics of the Lithium Iodide-Aluminum Oxide Solid Electrolytes"; J. Electrochem. Soc., Oct. 1973; pp. 1289-1292.

Rea, J.R. et al., "Development of a Solid-State Secondary Battery System"; Solid State Ionics 3/4 (1981); 267-271.

Okamoto, H.; The Li-S (Lithium-sulfur) System; Asahi University; Journal of Phase Equilibria, vol. 16, No. 1, Feb. 1995, pp. 94-97.

Liang, C.C., et al., "Solid-State Storage Battery System"; J. Applied Electrochemistry; 8 (1978)445-454.

https://en.m.wikipedia.org/wiki/Molten-salt_battery; pp. 1-5.

https://en.m.wikipedia.org/wiki/Ford Ecostar; pp. 1-4.

https://en.m.wikipedia.org/wiki/State_diagram; pp. 1-9.

Zhang, Shuo, et al.; "Advanced electrolyte/additive for lithium-ion batteries with silicon anode"; Science Direct; Current Opinion in Chemical Engineering; vol. 13, Aug. 2016; pp. 24-35.

Zhan Lin, et al., "Lithium-Sulfer Batteries: From Liquid to Solid Cells?" Department of Chemical & Biological Engineering, Zhejiang University, Hangzhou, Zhejiang, China; Center for Nanophase Materials Sciences, Oak Ridge National Laboratory, Oak Ridge, TN, USA.

https://authors.library.caltech.edu/5456/1/hrst.mit.edu/hrs/materials/public/Weber&Kummer1967.htm; Weber, Neil et al., Sodium-Sulfur Secondary Battery; Session on Vehicle Propulsion Batteries—Ford Motor Company.

Jolley et al., "Improving Ionic Conductity of NASICON through aliovalent cation substitution of Na3Xr2Si2PO12"; Ionics (2015) 21:3031-3038.

https://en.m.wikipedia.org/wiki/Ionic radius; pp. 1-12.

Thomas, Shane, International Preliminary Report on Patentability and Written Opinion, PCT/US2019/027339, The International Bureau of WIPO, dated Jul. 5, 2019.

Thomas, Shane, International Preliminary Report on Patentability and Written Opinion, PCT/US2019/027344, The International Bureau of WIPO, dated Jul. 10, 2019.

Thomas, Shane, International Preliminary Report on Patentability and Written Opinion, PCT/US2019/027351, The International Bureau of WIPO, dated Jul. 30, 2019.

Thomas, Shane, International Preliminary Report on Patentability and Written Opinion, PCT/US2019/027354, The International Bureau of WIPO, dated Jun. 27, 2019.

Thomas, Shane, International Preliminary Report on Patentability and Written Opinion, PCT/US2019/027356, The International Bureau of WIPO, dated Jul. 10, 2019.

Thomas, Shane, International Preliminary Report on Patentability and Written Opinion, PCT/US2019/027359, The International Bureau of WIPO, dated Jul. 10, 2019.

\* cited by examiner

DEVICES, SYSTEMS, AND METHODS TO MITIGATE THERMAL RUNAWAY CONDITIONS IN MOLTEN FLUID ELECTRODE APPARATUS

FIELD

This invention generally relates to high-temperature batteries with fluid electrodes and more particularly to methods, devices, and systems for mitigating thermal runaway conditions in high-temperature batteries with molten fluid electrodes.

BACKGROUND

A battery generally includes a positive electrode (cathode), a negative electrode (anode) and an electrolyte. A battery typically includes current collectors within the electrodes that direct electrical current to the terminals of the battery. Attempts have been made to use fluids for electrodes where one or both of the electrodes are maintained in a fluid state by heating the electrode material. These batteries are sometimes referred to as thermal batteries or high-temperature batteries and include, for example, devices sometimes referred to as liquid-metal batteries and rechargeable liquid-metal batteries. Unfortunately, decades of research and development have not produced a safe and reliable thermal battery using high gravimetric energy density (kWh/kg) electrochemical couples such as, for example, sodium and sulfur or lithium and sulfur.

BRIEF DESCRIPTION OF THE DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

Figure 1:
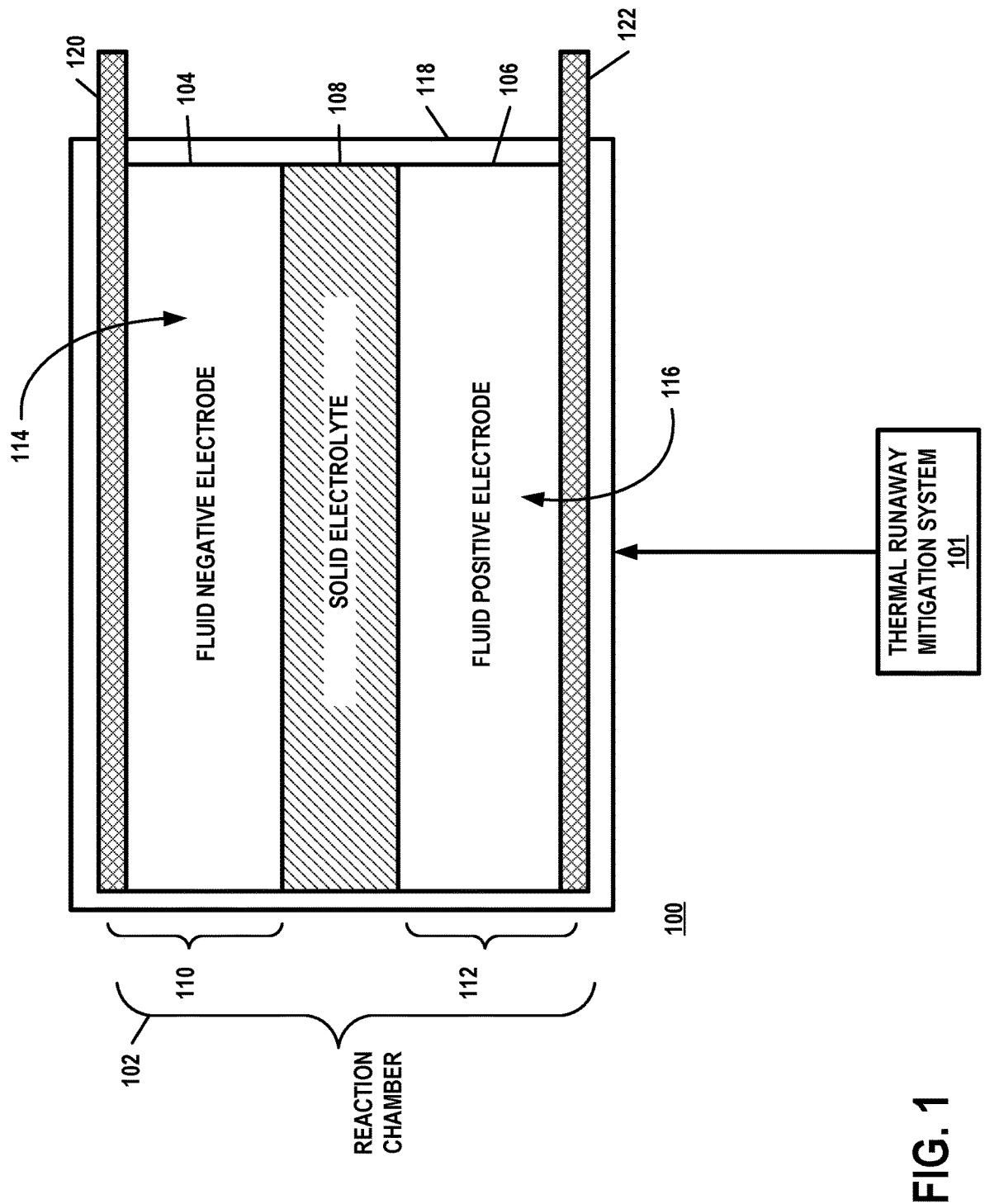
FIG. 1 is a block diagram of an example of a battery apparatus suitable for use with a thermal runaway prevention system.

Thermal batteries have several advantages over other types of batteries. The relatively low-cost, high energy-density, and high power-density of thermal batteries (high-temperature batteries) make these types of batteries highly attractive for several uses. Unfortunately, the safety issues with these devices has constrained widespread adoption. Due to highly energetic chemistry, thermal batteries have suffered from dangerous risks of fire and explosion. Conventional thermal battery designs include two pools of fluid (i.e., molten) materials separated by a third material. If the third material fails and allows the molten materials to mix and react, an immense amount of thermal energy is released in a short period of time. These conditions often lead to a dangerous fire condition or explosion. This severe limitation still continues today although the demand for a safe thermal battery has existed since inception of thermal batteries during World War II. Several decades of attempts have not resulted in an adequate solution to the problem. For example, some attempts include using a gravitational flow battery design in which one of the molten active materials is contained in a large reservoir located physically above a smaller reaction chamber where the walls of the reaction chamber are a solid electrolyte. On the other side of the solid electrolyte is a large reservoir of the other molten active material. In the event that the solid electrolyte fails and the two molten active materials are allowed to mix, the hope is that the solid products that are formed by the chemical reaction of the mixing of the two molten active materials will limit the flow of the active materials from the large reservoir located physically above with the other large reservoir of the other molten active material. The gravitational flow battery design attempt fails because the solid products that are intended to block the flow from the upper reservoir do not coalesce quickly enough at the operating temperature of the thermal battery. Therefore, the mixing of the two molten active materials is only slowed by this design and is insufficient to prevent a thermal runaway event. Other attempts include changing the chemistry of the molten active materials to a metal halide chemistry, such that a solid electrolyte failure does not cause a thermal runaway event. Unfortunately, this technique comes at the cost of decreasing the specific energy density (kWh/kg) and the volumetric energy density (kWh/l) to a point where the thermal battery is no longer a viable solution for many applications.

Research in thermal batteries has even been abandoned by some due to the high danger. For example, a major auto manufacturer developed a fleet of electric vehicles that used thermal sodium-sulfur batteries in 1993. During the testing, two vehicles burst into flames while charging. As a result of these fires, the manufacturer ended its thermal sodium-sulfur battery program, and the U.S. Department of Energy stopped their funding of thermal battery research. This is despite the enormous advantages that a safe thermal battery would provide to the electric vehicle industry as well as other industries. The relative light weight and low cost of thermal batteries clearly make these devices the best choice for use in electric vehicles if the danger of fire is mitigated.

In accordance with the techniques discussed herein, the fire danger of a thermal battery is minimized by cooling at least portions of the battery to prevent, or at least mitigate the chances of, a thermal runaway event. In response to detection of a potential thermal runaway situation, a cooling heat transfer fluid having a temperature less than the melting point of at least one of the electrode materials is directed to one or more areas within the battery to cool or at least limit the temperature of at least one of the electrode materials. In one example, at least one of the fluid electrodes is cooled below the melting point of the fluid electrode material to freeze the electrode (i.e., place the electrode material in a solid state).

Temperature management and cooling techniques have been proposed for conventional batteries for the purpose of optimizing their performance. However, conventional cooling techniques have not addressed devices with phase-transitioned fluid electrodes where the electrode material is heated from a solid to a liquid phase. More specifically, conventional cooling techniques are not implemented for the purpose of preventing or stopping thermal runaway events in thermal batteries comprising a phase-transitioned fluid electrode. Despite decades of research and concern regarding the dangers of thermal batteries, there has been no suggestion to avoid a thermal runaway event in a thermal fluid electrode battery by cooling at least one of the fluid electrode materials.

FIG. 1 is a block diagram of an example of a battery apparatus 100 suitable for use with a thermal runaway prevention system 101. The battery apparatus 100 includes a reaction chamber 102 having fluid electrodes 104, 106 separated by a solid electrolyte 108 in the example. The illustration in FIG. 1 depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 1 may be implemented in separate structures. The battery apparatus 100 of FIG. 1 is an example of a battery that is suitable for use with the thermal runaway prevention system 101. Both electrodes are heated to place them in a fluid state in the example of FIG. 1 although, in some other situations, only one of the electrodes may be heated to place it in the fluid state.

As discussed herein, a material is in a fluid state when the material has a consistency sufficiently liquefied to allow the material to flow from one area to another. In other words, the viscosity of a fluid material is such that the material can be directed, pumped, or can otherwise flow from one area to another. A fluid material may, however, have some components that are at least partially solid while others are in a liquid phase. As a result, a fluid material is not necessarily all in a liquid phase. As discussed herein, a material is in a non-fluid state where it is sufficiently solidified such that it cannot flow. In other words, the viscosity of the material in a non-fluid state is such that the material cannot be directed, pumped, or otherwise allowed to flow from one area to another. A non-fluid material, however, may have some components that are in a liquid phase as well as others that are in a solid phase. As referred to herein, a solid electrolyte is any material, mixture, compound, or other combination of materials that forms an electrolyte structure that is in a solid phase. Although the examples include a solid electrolyte, other types of electrolytes may be used in some situations with the discussed techniques.

The battery apparatus 100 includes at least a reaction chamber 102 having a negative electrode region 110 and a positive electrode region 112 separated from the negative electrode region 110 by the solid electrolyte 108. The negative electrode region 110 contains a negative electrode material 114 and the positive electrode region 112 contains a positive electrode material 116. A heating system 118 heats the positive and negative electrode materials in the reaction chamber 102 during operation. For the examples herein, the electrode materials 114, 116 are maintained in a fluid state when the battery 100 is operating by heating the electrode materials 114, 116 while maintaining the solid electrolyte 108 in a solid state. Accordingly, the operating temperature of the reaction chamber is below the melting point of the solid electrolyte 108 for the examples herein. The heating system 118 may be an electrical heating system including one or more heating elements that facilitate the heating of the reaction chamber 102 to place the electrode materials 114, 116 in a fluid state. Other types of heating systems 118 can be used in some circumstances. As discussed below, for example, a heating coil conveying a heating heat transfer fluid can be used to heat the battery housing containing the reaction chamber. The heating system, therefore, heats the reaction chamber such that the negative electrode material 114 and the positive electrode material 116 are in a fluid state while the solid electrolyte 108 is maintained in a solid state.

The solid electrolyte 108 includes at least cations of the negative electrode material 114 and anions where the anion is selected to be relatively large and chemically stable with the materials within the reaction chamber 102. Some examples of negative electrode materials 114 include lithium, sodium, potassium, rubidium, and cesium. Some examples of anions include anions of chorine, bromine, and iodine. Other materials can be used in some circumstances, such as beta alumina and beta" alumina where the anions are more complex.

The fluid negative electrode material 114 in the negative electrode region 110 forms a fluid negative electrode 104 of the battery 100. The fluid positive electrode material 116 in the positive electrode region 112 forms a fluid positive electrode 106 of the battery 100. The fluid electrodes 104, 106 and the electrode materials may include more than a single element. For example, the positive electrode region 112 may also contain some reaction products resulting from the operation of the battery 100. A first current collector 120 is positioned within the fluid negative electrode 104 and second current collector 122 is positioned within the positive fluid electrode 106. With the properly placed current collectors 120, 122 within each electrode 104, 106, electrical energy can be harnessed from the electrochemical reaction occurring within the battery between the fluid negative electrode 104 and the fluid positive electrode 106 through the solid electrolyte 108. Therefore, the operation of the reaction chamber 102 in the example of FIG. 1 is similar to the operation of conventional thermal batteries. A significant advantage over conventional thermal batteries, however, includes a thermal runaway prevention system 101 that prevents the battery from entering or continuing a thermal runaway event. At least one of the fluid electrode materials is cooled to a prevention temperature such that any unwanted reaction amongst any materials within the battery or amongst any materials within the battery and any materials outside the battery is hindered to a safe threshold. In one example, each electrode material is cooled below the melting point of the electrode material to freeze both electrode materials. In other words, the electrode material in the reaction chamber is sufficiently cooled to place electrode material in the solid state. In some situations, the electrode material is cooled to a temperature higher than the melting point temperature of the electrode material, but below a prevention temperature where unwanted reactions are less likely. In one example where the battery apparatus 100 has a lithium fluid electrode, the electrode material comprising lithium is cooled to temperatures below 600° F. (315.5° C.). Molten lithium at temperatures below 600° F. (315.5° C.) does not combust in air where molten lithium at temperatures at or above 600° F. (315.5° C.) will combust in air. In some situations, therefore, cooling the lithium electrode material to a temperature below 600° F. (315.5° C.) may be sufficient to protect the lithium from reacting with air and sufficient to avoid, or at least minimize, thermal runaway conditions. The electrode material that is cooled may include electrode material anywhere within the battery system and not only in the reaction chamber if the battery includes fluid electrode material in other components in the battery 100.

As discussed above, the battery apparatus 100 may be implemented with different materials and electrochemical couples. In one example, the negative electrode comprises lithium (Li) and the positive electrode comprises sulfur (S). An example of a suitable solid electrolyte 108 in such an implementation is lithium iodide (LiI). In another example, a sodium-sulfur (NaS) battery includes a fluid negative electrode comprising sodium (Na) and a fluid positive electrode comprising sulfur (S). Other materials may also be used for the electrodes. Further, the electrode materials may contain mixtures or compounds that include multiple elements in some circumstances. For example, in some liquid-metal batteries, a molten mixture of sulfur and phosphorus can be used for the fluid positive electrode.

The operating temperature, or temperature ranges, of the negative electrode region and positive electrode region may be selected based on several factors including, for example, the melting point of the negative electrode material, the melting point of the positive electrode material, the boiling point of the negative electrode material, the boiling point of the positive electrode material, the eutectic point of the positive electrode material and resulting chemical species, and the melting point of the solid electrolyte. For the examples discussed herein, the heating system 118 maintains the negative electrode region 110 and the positive electrode region 112 of the reaction chamber 102 at the same temperature in order to avoid a temperature gradient across the solid electrolyte 108. In some situations, the two regions of the reaction chamber may be maintained at different temperatures.

As discussed herein, a thermal runaway event is any event where unwanted reactions occur with at least one of the battery materials that release heat sufficient to increase the temperatures within the battery that foster further unwanted reactions or unwanted phase changes of the materials of the battery. For instance, a thermal runaway could melt the structures of the battery that could lead to further unwanted reactions. In some situations, the reactions can occur very quickly and cause catastrophic results. In one example of a thermal runaway event, a breach in separation components in the battery allows the positive fluid electrode material to mix with the negative fluid electrode material. A breach in the solid electrolyte, for example, may allow the two electrode materials to mix. The exothermic reaction between the two materials releases an immense amount of heat which often leads to fire. In some situations, a thermal runaway event may result from the fluid electrodes reacting with water or oxygen outside of the battery. During operation of the battery, the thermal runaway prevention system 101 monitors one or more parameters to determine whether thermal runaway prevention measures should be initiated. The one or more parameters may be measured and/or calculated parameters and may be battery operational parameters related to the operation of the battery as well as environmental parameters. Some examples of battery operational parameters that may be monitored include temperature, voltage, current, moisture, pressure, power output, as well as changes in these parameters over time or across portions of the battery. Some examples of environmental parameters include presence of water, external temperatures, deacceleration/acceleration of the battery, orientation of the battery relative to Earth, and external parameters provided by other systems associated with the battery, such as vehicle systems of a vehicle containing the battery. A vehicle system, for example, may provide parameters related to accident detection and rapid deacceleration of the vehicle. Criteria is applied to any combination and number of measured parameters and/or any number of calculated values to determine if a thermal runaway event trigger has occurred. Therefore, one of more parameters are evaluated to determine if a thermal runaway trigger event or hazardous event has occurred. In a relatively simple situation, for example, the thermal runaway prevention system 101 may determine a thermal runaway trigger event has occurred where a temperature of a fluid electrode has exceeded a threshold. In response to a determination that a thermal runway trigger event has occurred, the thermal runway prevention system 101 initiates a thermal prevention procedure that includes cooling at least a portion of the battery apparatus 100.

Figure 2:
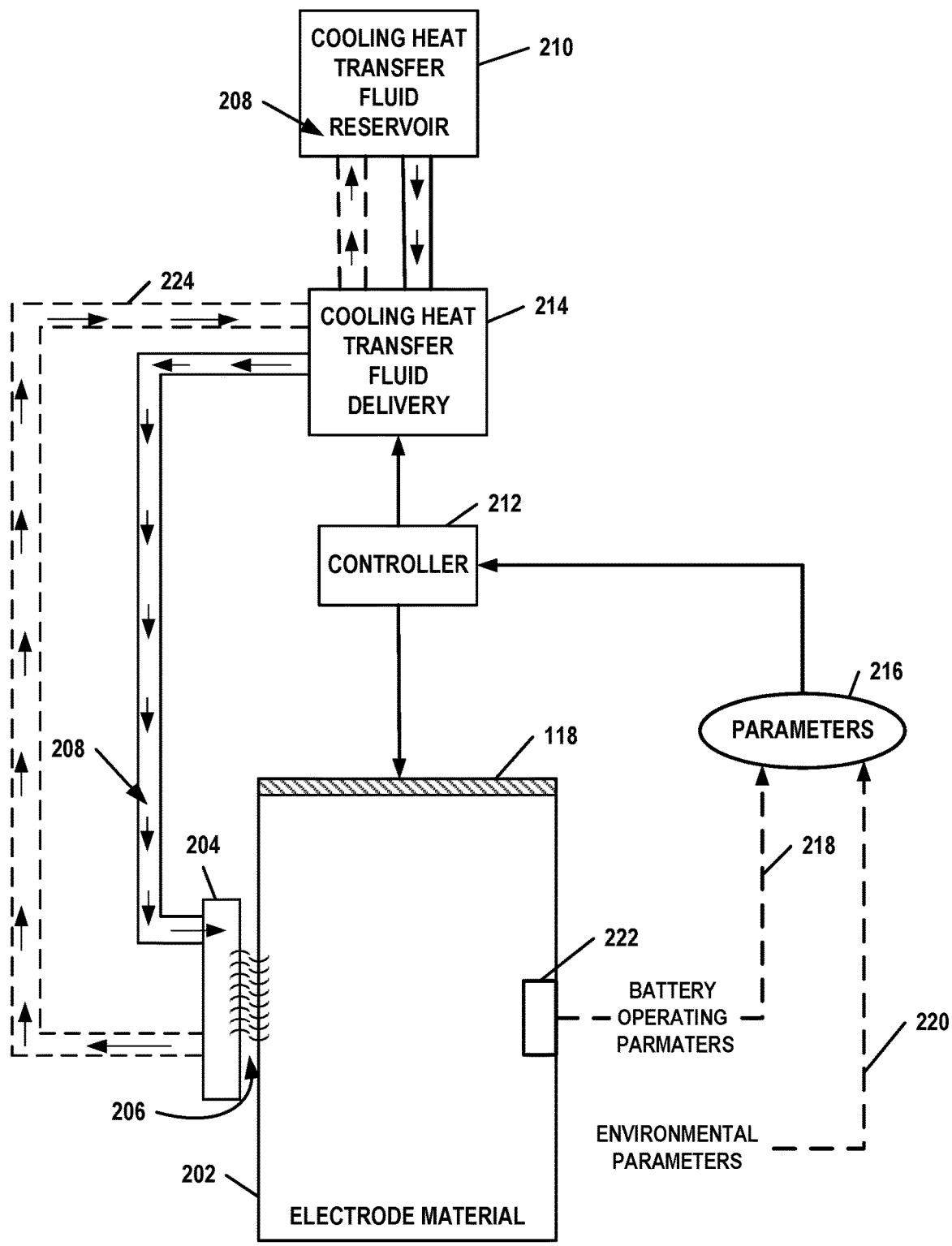
FIG. 2 is a block diagram of an example of the thermal runaway prevention system for a thermal battery.

FIG. 2 is a block diagram of an example of the thermal runaway prevention system 101 for a thermal battery. As discussed above, the thermal runaway prevention system 101 is suitable for use with thermal batteries that include fluid electrodes separated by a solid electrolyte where the electrodes are in a fluid state during operation of the battery and have been heated to make them fluid. As discussed above, the thermal batteries include a heating system 118 that heats the electrode materials to a temperature sufficiently high to place the electrode materials in a fluid state. In order to prevent or reverse a thermal runaway event, the thermal runaway prevention system 101 cools at least one of the fluid electrode materials. In some situations, the system 101 may cool the electrode material to a temperature sufficiently low to freeze the electrode material. In such an implementation, therefore, the thermal runaway prevention system 101 cools at least one of the electrode materials below the melting point of the electrode material to place the electrode material in the solid state. Although both electrodes are in the fluid state during operation in the examples discussed herein, the thermal runaway prevention system 101 can be used with thermal batteries that include only a single liquid electrode at the operating temperature. For the example of FIG. 2, the electrode material 202 includes all of the fluid electrode material within the battery and, therefore, includes the two fluid electrodes in the reaction chamber and any other electrode material within any pumps, reservoirs, and channels that may be within the battery. As discussed above, the fluid electrode material that is cooled may be anywhere within the battery. Although FIG. 2 shows the electrode material as a single block, the electrode material may include multiple materials (e.g., positive electrode material and negative electrode material) as well as discrete and separate portions of electrode materials. In some situations, however, the electrode material 202 that is cooled may only include some of the total electrode material contained in the battery. Accordingly, the fluid electrode block shown in FIG. 2 may represent a single portion of material in a single location, multiple portions of material distributed at different locations, or all of the electrode material in a single location in the battery depending on the particular implementation. Although the heating system 118 is shown on one side the block representing the fluid electrode material 202, the heating system 118 may be positioned in any of numerous positions relative to the fluid electrode material(s) within the battery.

For the examples herein, the thermal runaway prevention system 101 includes a heat transfer element 204 that is thermally coupled to the electrode material 202 through a thermally conductive interface 206. In response to a thermal runaway trigger, cooling heat transfer fluid 208 is directed to heat transfer element 204 to facilitate heat transfer from the fluid electrode material 202 to the cooling heat transfer fluid 208 to cool the electrode material 202. The heat transfer element 204 may have any of numerous configurations or structures. In some situations, the heat transfer element 204 is in contact with a thermally conductive component that is also thermally conductive with the fluid electrode material 202. The heat transfer element 204, therefore, may be positioned next to a chamber wall that houses the electrode material 202, for example. In some situations, the heat transfer element 204 may be positioned within the electrode material 202. The heat transfer element 204 may include heat exchange conduits imbedded in the electrode material 202, for example. The heat transfer element 204 may serve other purposes in addition to the functions related to heat transfer from the fluid electrode material. In one example, the heat transfer element 204 is the wall of the housing (container) that contains the fluid electrode material 202 where the cooling heat transfer fluid 208 is injected into a space next to the container wall in response to the thermal runaway trigger. Therefore, the thermal runaway mitigation system 101 directs cooling heat transfer fluid 208 to an area within the battery 100 that allows the cooling heat transfer fluid to be thermally conductive with at least one of the fluid electrode materials.

For the examples herein, the cooling heat transfer fluid 208 is maintained in a cooling heat transfer fluid reservoir 210 during normal operation of the battery. When the thermal runaway trigger is detected, the cooling heat transfer fluid 208 is directed from the cooling heat transfer fluid reservoir 210 to the heat transfer element 204. For the example of FIG. 2, a controller 212 monitors one or more parameters to determine whether a thermal runaway trigger event has occurred. In response to determining that the trigger has occurred, the controller 212 causes a cooling heat transfer fluid delivery mechanism 214 to deliver the cooling heat transfer fluid 208 to the heat transfer element 204. For the examples herein, the controller 212 also turns off the heating system 118. In some situations, the controller 212 may also disconnect the battery or otherwise disable the battery from providing power. For example, the controller 212 may open circuit breakers or switches in response to detecting the thermal runaway trigger. The controller 112 is any controller, processor, electrical circuit, logic circuit, processing circuit, or processor arrangement that manages the functions described herein as well as facilitating the overall functionality of the thermal runaway mitigation system 101. In some situations, the controller 212 also manages functions of other thermal battery components.

An example of a suitable technique of directing the cooling heat transfer fluid includes using one or more pumps to pump the cooling heat transfer fluid. In some situations, the cooling heat transfer fluid is directed to the heat transfer element 204 using gravity. For example, the cooling heat transfer fluid reservoir can be positioned above the heat transfer element such that a valve can be opened to allow the cooling heat transfer fluid 208 to flow to the heat transfer element 204. Therefore, the cooling heat transfer fluid delivery mechanism 214 includes any element, device or system that delivers the cooling heat transfer fluid 208 to the heat transfer element to cool the fluid electrode material 202. In some situations, the controller 212 may be omitted or integrated with the cooling heat transfer fluid delivery mechanism 214. In one example of such a situation, the cooling heat transfer fluid delivery system 214 includes a temperature sensitive valve that opens when a threshold temperature is reached to allow the cooling heat transfer fluid 208 to flow to the heat transfer element 204.

The controller 212 evaluates at least one parameter 216 to determine whether a thermal runaway trigger has occurred. The thermal runaway trigger, however, may be based on any number of factors, parameters, and criteria. As discussed above, the one or more parameters may be measured and/or calculated parameters and may be battery operational parameters 218 related to the operation of the battery as well as environmental parameters 220. Some examples of battery operational parameters 218 that may be monitored include temperature, voltage, current, moisture, pressure, power output, orientation relative to Earth, as well as changes in these parameters over time or across portions of the battery. Battery operation parameters, therefore, may include values provided by one or more sensors 222 connected to, or otherwise in proximity to, the battery components. The sensors 222 may include devices such as volt meters, current meters, humidity sensors, moisture sensors, pressure sensors, thermal couples, gyroscopes, and accelerometers.

As discussed above environmental parameters 220 may include external temperatures and moisture levels, deacceleration/acceleration of the battery, orientation of the battery relative to Earth, and external parameters provided by other systems associated with the battery such as vehicle systems of a vehicle containing the battery. A vehicle system, for example, may provide parameters related to accident detection and rapid deacceleration of the vehicle. Criteria is applied to any combination and number of measured parameters and/or any number of calculated values to determine if a thermal runaway event trigger has occurred. The criteria may be applied such that multiple thermal runaway triggers can be identified from an individual parameter or combination of parameters. For example, a first thermal runaway trigger may be based only on a temperature of a fluid electrode material and second thermal runaway trigger may be based on a combination of parameters such as a sudden increase in temperature and a moisture parameter exceeding a moisture threshold. Some parameters may apply to more than one trigger. For example, one trigger may be met by the temperature of an electrode material exceeding a maximum threshold and a second trigger may be met by the temperature of the electrode material exceeding another threshold when a current through the battery exceeds a current threshold. In another example, one trigger may be met by the voltage across a cell dropping below a threshold that would indicate a breach in the solid electrolyte. The trigger criteria, therefore, may be based on any combination and number of parameters including battery operational parameters and external parameters.

The cooling heat transfer fluid 208 is any material that can be maintained in a fluid state and can be delivered to the heat transfer element 204. In some situations, the cooling heat transfer fluid may be maintained at the ambient temperature. In other situations, however, the cooling heat transfer fluid is cooled below the ambient temperature. For example, some silicon heat transfer fluids can be cooled to −40° C. and still remain in a liquid state, such as SYLTHERM™ Silicone Heat Transfer Fluid manufactured by The Dow® Chemical Company. In such a situation, the cooling heat transfer fluid reservoir 210 has cooling elements which may include elements that are part of a refrigeration system circulating refrigerant through an evaporator and condenser. In other situations, reverse thermal couples may provide the cooling elements. Selection of the cooling heat transfer fluid is typically based at least on thermal dynamic properties and chemical stability with other battery components. Materials that are reactive with either of the fluid electrode materials are typically less desirable alternatives because of the possibility of mixing of the materials in the event of a breach within the battery. For example, cooling heat transfer fluids containing water may be avoided in batteries having an electrode including fluid lithium since molten lithium and water are highly reactive.

In some situations where the cooling heat transfer fluid reservoir 210 is part of, or connected to, a refrigeration system, the cooling heat transfer fluid can be returned to the reservoir 210 after passing through the heat transfer element 204. A heat transfer fluid return conduit 224 is illustrated with a dashed line in FIG. 2 to indicate that such a return path is optional. A refrigeration system that cools the cooling heat transfer fluid 208 may include a refrigerant that is cycled through a compressor, evaporator, and condenser in accordance with known techniques.

The thermal runaway mitigation system 101 may have any of numerous structures and configurations which may depend on the battery structure as well as other design considerations. Examples of two suitable battery configurations include a tubular structure and a planar structure. A tubular structure of a battery reaction chamber typically includes concentric cylinders of the fluid electrodes separated by a cylindrical solid electrolyte. A battery having a reaction chamber with a planar structure typically includes planar sections of the fluid electrodes separated by a planar solid electrolyte. As discussed below, thermal runaway mitigation systems 101 having heat transfer fluid within cooling coils can be used with both planar and tubular battery structures.

Figure 3A:
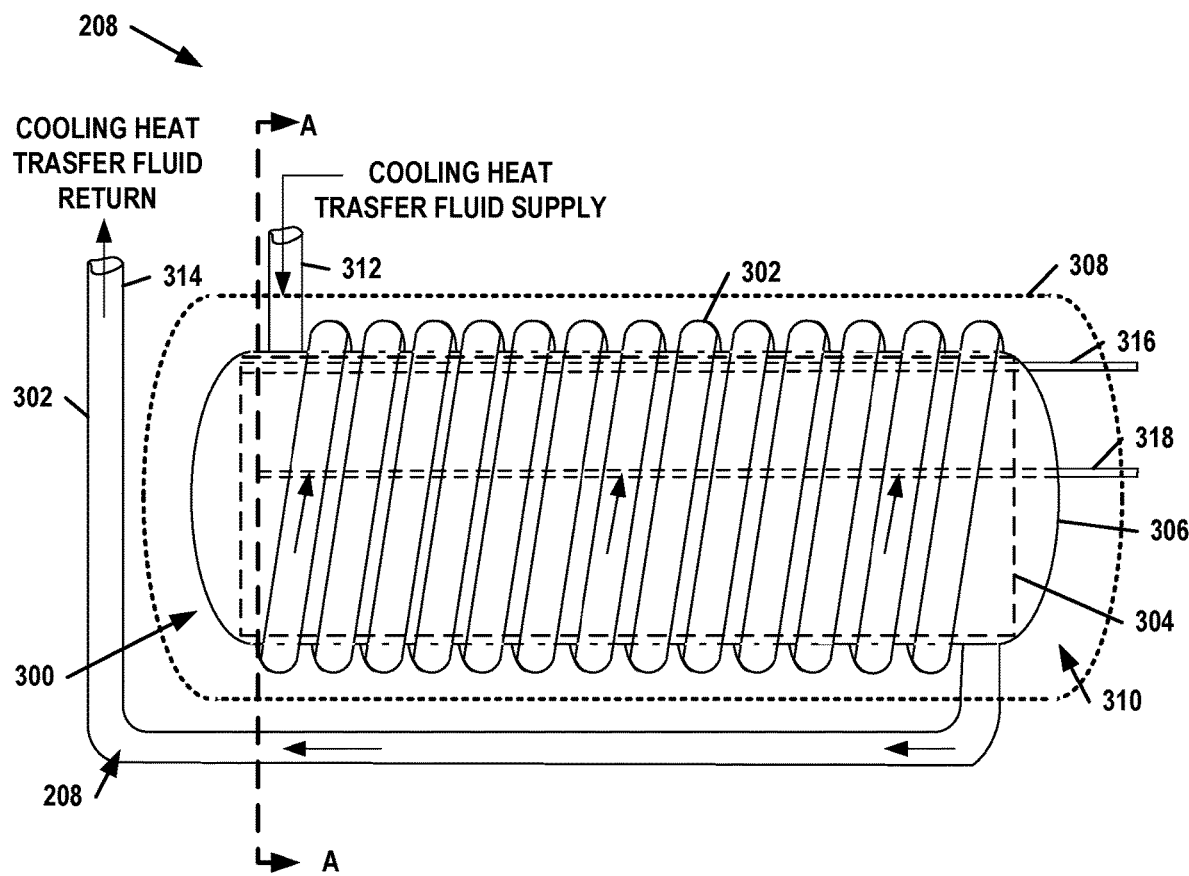
FIG. 3A is an illustration of a side view of one example of a battery with a tubular structure where the heat transfer element comprises a cooling coil.
Figure 3B:
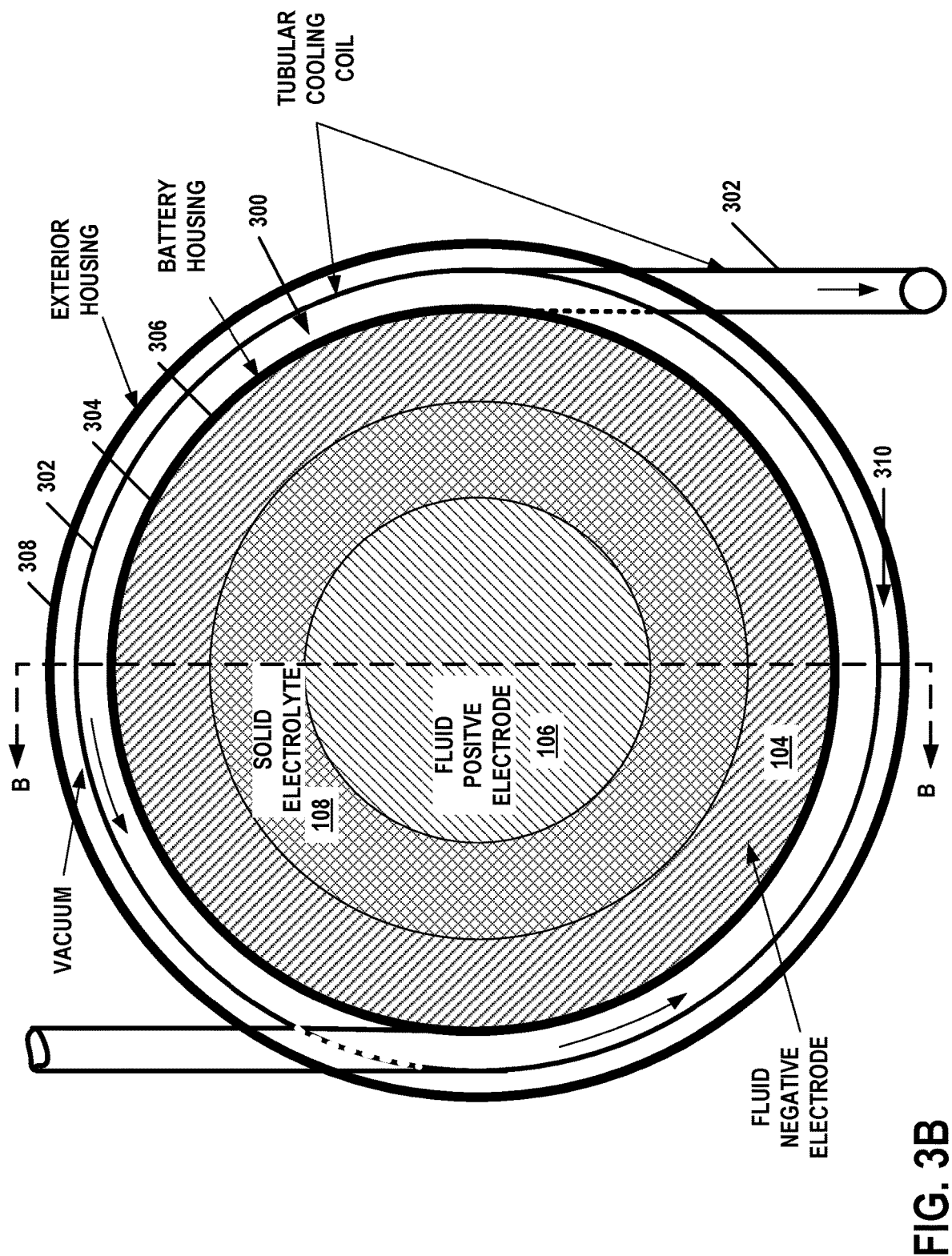
FIG. 3B is an illustration of a cross-sectional front view taken along line A-A in FIG. 3A of the example of the battery with the tubular structure where the heat transfer element comprises a cooling coil.
Figure 3C:
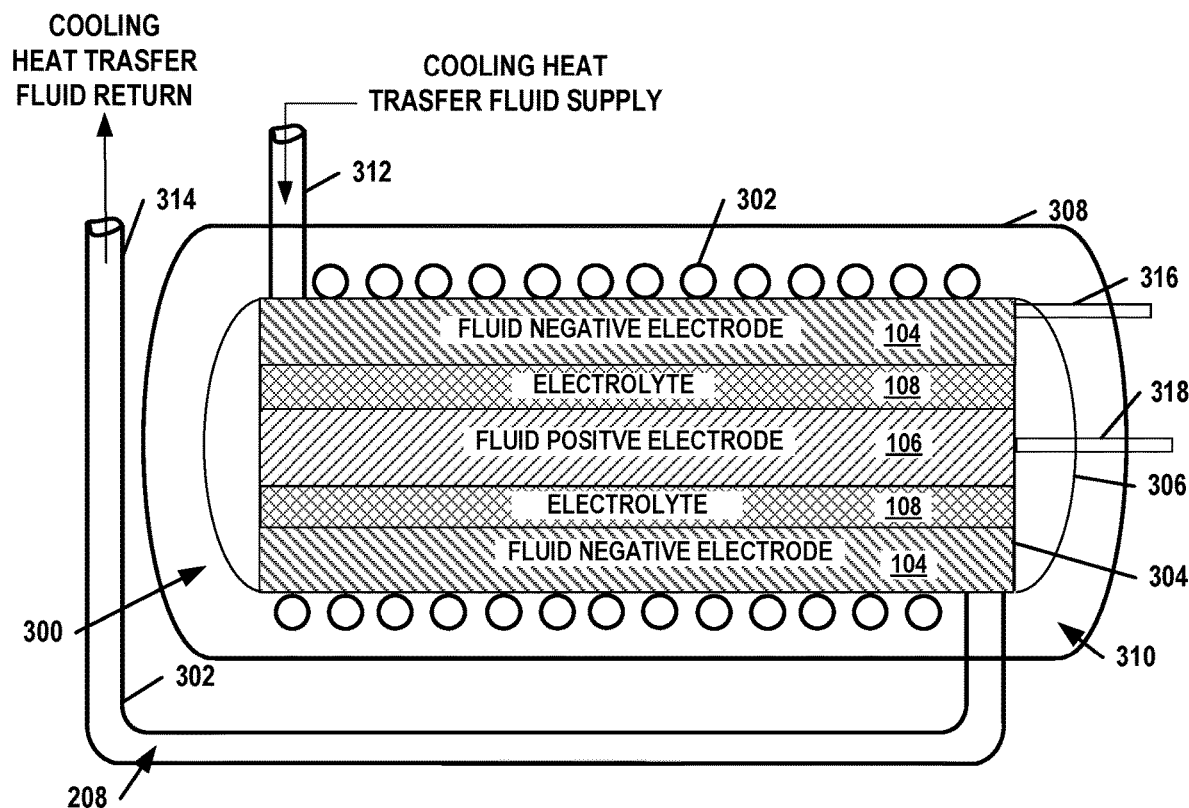
FIG. 3C is an illustration of a cross-sectional side view taken along B-B in FIG. 3B of the example of the battery with the tubular structure where the heat transfer element comprises a cooling coil.

FIG. 3A, FIG. 3B, and FIG. 3C are illustrations of different views of one example of a battery 300 with a tubular structure where the heat transfer element 204 comprises a cooling coil 302. The illustration in FIG. 3A, FIG. 3B, and FIG. 3C depict the general principles of the example, are not necessarily to scale, and do not necessarily represent specific shapes, relative sizes, distances, or other structural details of the represented components. The battery 300 is an example of the battery 100 where the reaction chamber 102 is a tubular reaction chamber 304 within a battery housing 306. In the interest of clarity, the heating system is not shown in FIG. 3A, FIG. 3B, and FIG. 3C. The heating system 118 may include an electrical heating coil that is wrapped around and in contact with the battery housing 306 in some situations. In an example discussed below with reference to FIG. 4, the heating system 118 includes a heating coil positioned next to the cooling coil 302 where a heating heat transfer fluid is flowed through the heating coil.

FIG. 3A is an illustration of a side view, FIG. 3B is an illustration of a cross-sectional front view taken along line A-A in FIG. 3A, and FIG. 3C is an illustration of a cross-sectional side view taken along B-B in FIG. 3B of the example. The cooling coil 302 is any system of tubes, pipes, conduits, or other similar mechanisms that can contain the cooling heat transfer fluid 208 and facilitate cooling the fluid electrode material. For the example of FIG. 3A, FIG. 3B and FIG. 3C, a single cooling tube is coiled around the battery housing 306 of the battery reaction chamber 304 and is thermally conductive with the housing 306. In some situations, multiple cooling coils can be used. For the example, an external housing 308 surrounds the battery 300 and the cooling coil 302 and a vacuum 310 is formed between the external housing and the battery housing 306. In the interest of clarity, the cooling coil 302 in the figures is shown with a spacing between the coils of the cooling coil 302. In many situations, the coils of the cooling coil 302 are positioned adjacent to each other eliminating the space between the coils. Other spacings can be used and may not necessarily be uniform between all of the coils. The external housing 308 is depicted with a dotted line in FIG. 3A to indicate that the view is showing the external housing as transparent. The vacuum 310 provides an insulative thermal jacket around the battery 300 which reduces the loss of heat from the battery 300 during operation. The cooling coil 302, therefore, is positioned within the vacuum 310 between the external housing 308 and the battery housing 306 and is not in physical contact with the external housing 308. In some situations, the cooling coil 302 can touch the external housing 308. In yet other situations, one or more additional housings can be used to form additional insulative jackets around the battery 300 and/or other components associated with the battery 300. The cooling coil 302 includes an input 312 and an output 314 that extend past and through the external housing 308 and connect to the other components of the thermal runaway mitigation system 101. The current collectors 120, 122 are each connected to a terminal connection 316, 318 that extend through the housings 306, 308.

During operation, cooling heat transfer fluid 208 is pumped, flowed, or otherwise directed through the input 312 of the cooling coil 302, through the cooling coil 302 and out through the output 314. As discussed above, the cooling heat transfer fluid 208 is pumped into the cooling coil 302 in response to the thermal runaway trigger. The heat from the battery reaction chamber 304 conducts through the battery housing 306, through the wall of the cooling coil 302, and to the cooling heat transfer fluid 208.

In one example, the cooling heat transfer fluid 208 is cycled through the cooling coil in response to the trigger until the electrode material 202 has been sufficiently cooled. In such an example, the cooling heat transfer fluid 208 is pumped through the cooling coil 302, returned to a cooling mechanism (not shown) and again pumped through the input of the cooling coil 302. The cooling heat transfer fluid 208 can be cooled to the ambient temperature or to a temperature below the ambient temperature. A heat exchanger exposed to an ambient temperature can be used to cool the cooling heat transfer fluid 208.

In another example, the cooling heat transfer fluid 208 is propelled into the cooling coil 302 without continuously cycling and cooling the cooling heat transfer fluid 208. Such a technique may be appropriate where the, heat capacity, temperature, and volume of the cooling heat transfer fluid 208 is sufficient to cool the battery reaction chamber 304 to a safe temperature without re-cooling the cooling heat transfer fluid 208 after it has absorbed the heat from the battery 300. In such a situation, the cooling coil 302 near the battery may be empty or may include a fluid before the cooling heat transfer fluid is injected. Where the cooling coil 302 contains a fluid, the fluid is pumped out through the output 314 as the cooling heat transfer fluid 208 is pumped into the cooling coil 302 through the input 312. Where the cooling coil 302 is empty prior to the trigger, a vacuum can be formed within the cooling coil 302 such that when the cooling heat transfer fluid 208 is released into the cooling coil 302 in response to the trigger, the vacuum within the coil sucks the cooling heat transfer fluid into cooling coil 302.

As discussed above, the tubular structure typically includes concentric cylindrical sections of fluid electrode materials and solid electrolyte. For the examples of FIG. 3A, FIG. 3B, and FIG. 3C, the fluid negative electrode 104 forms the outermost cylindrical portion of the tubular reaction chamber 304. Accordingly, the fluid negative electrode 104 is nearest the battery housing 306 and the fluid positive electrode 106 is nearest the center of the cylindrical structure. Such an arrangement may be favored where cooling the negative electrode material before the positive electrode material is preferred.

Figure 4:
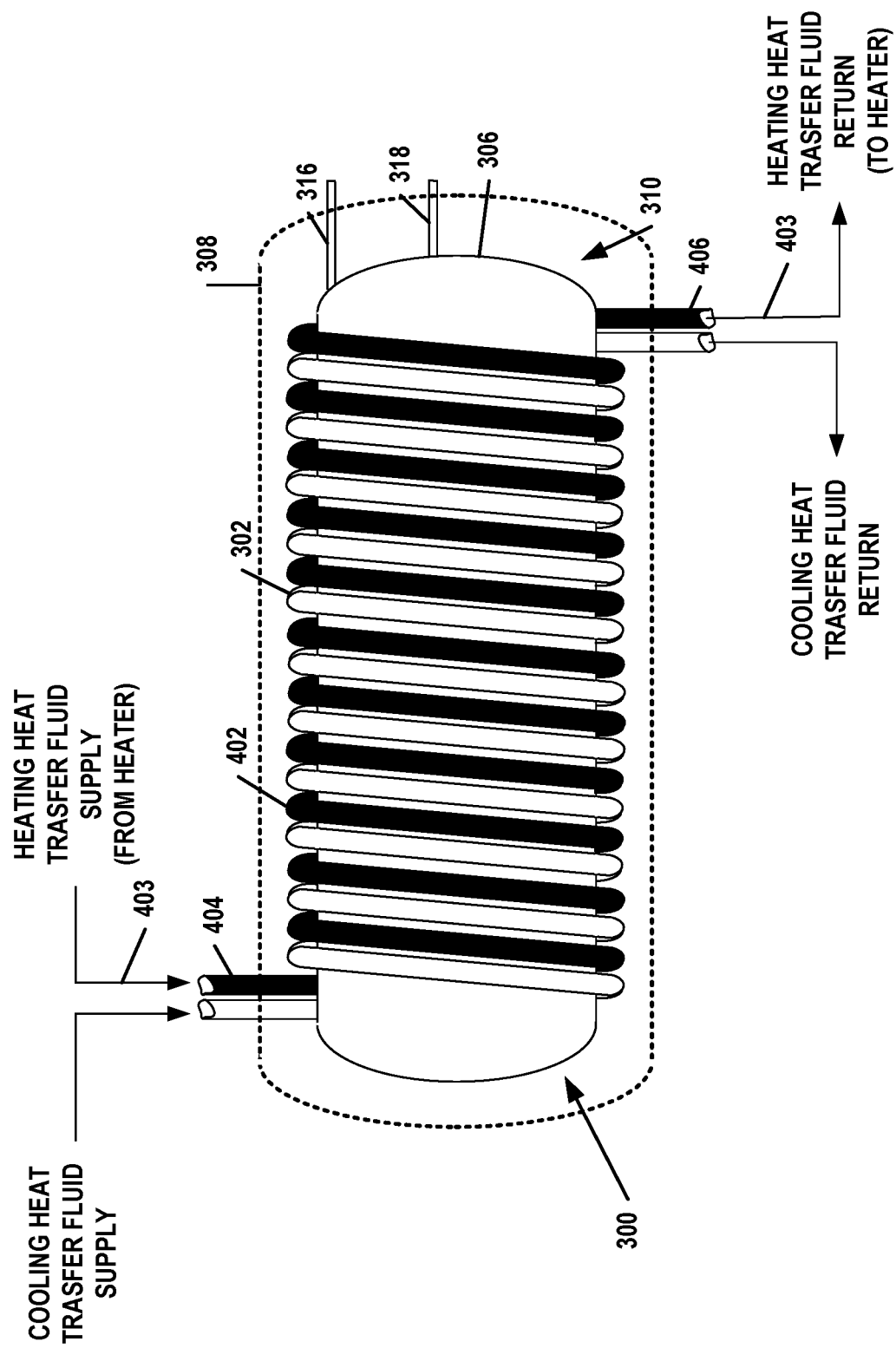
FIG. 4 is a side view of the battery with a tubular structure where the heat transfer element comprises a cooling coil and the heating system comprises a heating coil.

FIG. 4 is a side view of the battery 300 with a tubular structure where the heat transfer element 204 comprises a cooling coil 302 and the heating system 118 comprises a heating coil 402. The cooling coil 302 is shown with solid white fill and the heating coil 402 is shown with a solid black fill in FIG. 4. The cooling coil 302 and battery 300 operate as discussed above. The heating heat transfer fluid is flowed through the heating coil 402 to heat the battery 300 to the operating temperature of the battery 300. The heating coil 402 is a tubular coil, tube, pipe, conduit, or other similar mechanism that is wrapped around the battery housing 306 and facilitates heat transfer from the heating heat transfer fluid, through the wall of the heating coil 402, through the battery housing 306 and to the reaction chamber 304. For the example of FIG. 4, the coils of the heating coil 402 are positioned between the coils of the cooling coil 302. Other arrangements can be used in some circumstances.

During operation, a heater (not shown) heats the heating heat transfer fluid 403 to a sufficiently high temperature. The heating heat transfer fluid is then pumped, or otherwise flowed, through a heating coil input 404 of the heating coil and through the coils of the heating coil 402. The heating heat transfer fluid 403 exits the heating coil output 406 and is directed back to the heater. For the example of FIG. 4, the channels used to convey the heating heat transfer fluid to and from the heating coil 402 are the same as the heating coil 402. In other words, the heating coil is extended through the housing to the heater. In some situations, other types of channels can be used. The channels or conduits can be insulated to reduce heat loss. One example of suitable insulation includes an additional vacuum jacket. Heat transfer occurs from the heating heat transfer fluid 403, through the heating coil 402 material, through the battery housing 306 to the reaction chamber materials with the housing 306. Techniques can be used to improve heat transfer through the interface between the heating coil 402 and the housing 306 surface. For example, the heating coil 402 may have a rectangular cross section such that the surface area of the heating coil 402 that is in contact with the housing surface is increased. Therefore, such a "flattened" heating coil has more contact with the housing 306. Another example of a technique to increase heat transfer through the interface includes using a corrugated surface on the housing 306, heating coil 402, or both. In yet another example, the interior of the heating coil can be configured to have elements that protrude into the heat transfer fluid increasing surface area in contact between the heat transfer fluid and the heating coil 402. A similar technique can also be used with the housing 306 wall to increase surface area contact between the housing and the reaction chamber materials.

In some situations, multiple heating coils can be used to more uniformly heat the reaction chamber 102. For example, a first heating coil having a heat transfer fluid flow in one direction (e.g., left to right in FIG. 4) can be interlaced with a second heating coil having a heat transfer fluid flow in the opposite direction (e.g., right to left in FIG. 4).

During operation of the battery, therefore, the heating coil 402 heats the reaction chamber to the operating temperature. The controller 212 monitors parameters 216 and applies trigger criteria to determine if a thermal runaway trigger has occurred. In response to determining that a trigger has occurred, the controller 212 disables or otherwise causes the heating coil to stop heating the battery reaction chamber 304 and causes the cooling coil 302 to cool the battery reaction chamber 304. For the examples herein, the cooling coil is separate from heating coil 402. In some situations, however, the same coil can be used to heat and cool the battery 300. For example, heated heat transfer fluid can be flowed through the coil during operation to heat the battery and, in response to a thermal runaway trigger, the heated heat transfer fluid can be replaced with cooling heat transfer fluid. An example of a suitable techniques of managing the heat transfer fluids of such systems includes using valves and pumps to divert the appropriate heat transfer fluid though the coil.

Figure 5A:
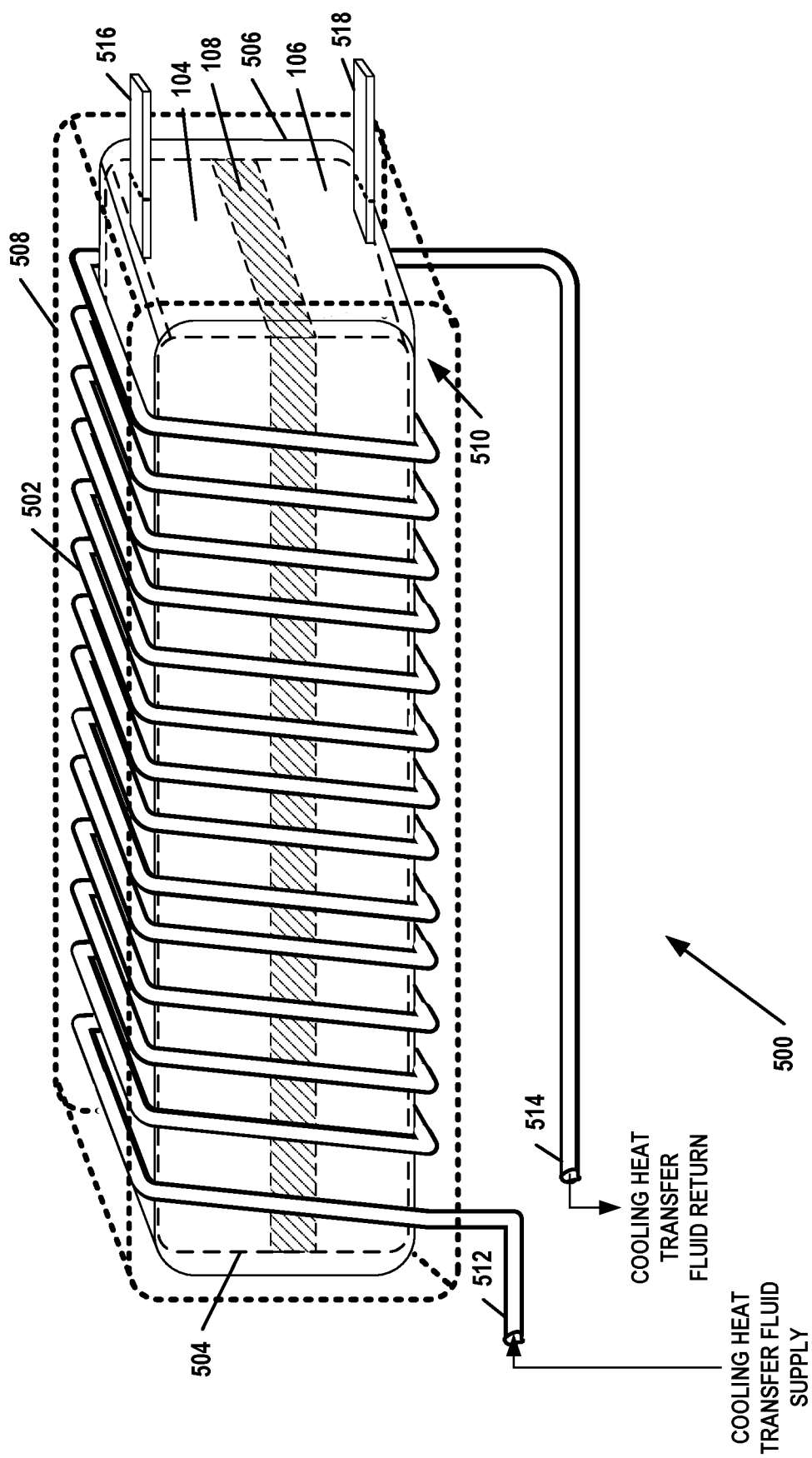
FIG. 5A is a perspective view illustration of an example of a planar thermal battery planar tubular structure where the heat transfer element comprises a cooling coil.
Figure 5B:
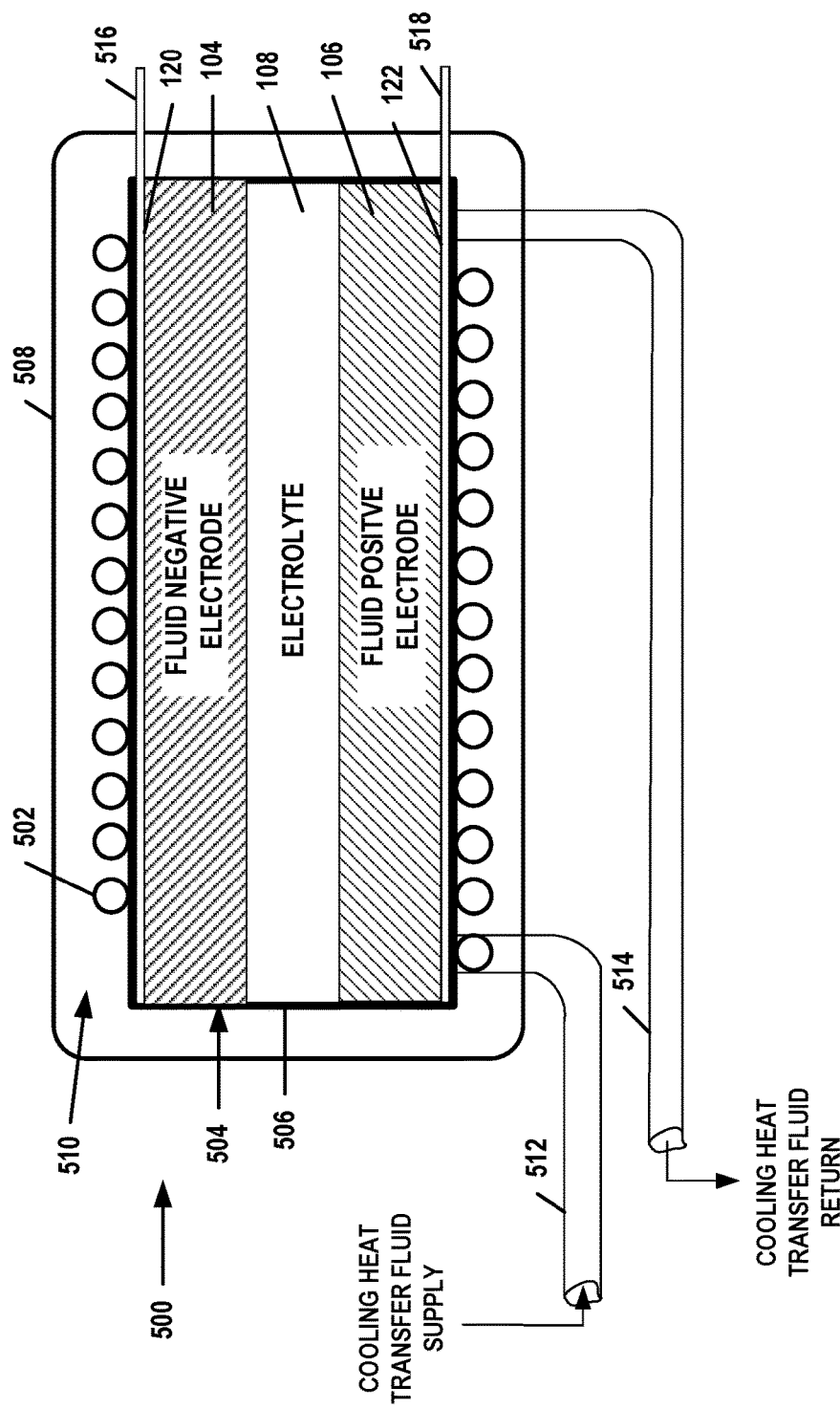
FIG. 5B is an illustration of a cross-sectional front view of the battery.

FIG. 5A is a perspective view illustration of an example of a planar thermal battery 500 planar tubular structure where the heat transfer element 204 comprises a cooling coil 502. FIG. 5B is an illustration of a cross-sectional front view of the battery 500. The battery 500 is an example of the battery 100 where the reaction chamber 102 is a planar reaction chamber 504 within a battery housing 506. The planar structure of the reaction chamber 504 typically includes a planar fluid positive electrode 106 and a planar fluid negative electrode 104 that are separated by a planar solid electrolyte 108. The components are contained in the sealed battery housing 506. In the interest of clarity, the heating system 118 is not shown in FIG. 5A and FIG. 5B. The heating system 118 may include an electrical heating coil that is wrapped around and in contact with the battery housing 506 in some situations. In an example discussed below with reference to FIG. 6, the heating system includes a heating coil positioned next to the cooling coil 502 where a heating heat transfer fluid is flowed through the heating coil.

The cooling coil 502 is any system of tubes, pipes, conduits, or other similar mechanisms that can contain the cooling heat transfer fluid 208 and facilitate cooling the fluid electrode material. For the example of FIG. 5A, FIG. 5B, a single cooling tube is coiled around the battery housing 506 of the battery reaction chamber 504 and is thermally conductive with the housing 506. In some situations, multiple cooling coils can be used. For the example, an external housing 508 surrounds the battery 500 and the cooling coil 502 and a vacuum 510 is formed between the external housing 508 and the battery housing 506. In the interest of clarity, the cooling coil 502 in the figures is shown with a spacing between the coils of the cooling coil 502. In many situations, the coils of the cooling coil 502 are positioned adjacent to each other eliminating the space between the coils. Other spacing can be used and may not necessarily be uniform. The external housing 508 is depicted with a dotted line in FIG. 5A to indicate that the view is showing the external housing 508 as transparent. The vacuum 510 provides an insulative thermal jacket around the battery 300 which reduces the loss of heat from the battery 500 during operation. The cooling coil 502, therefore, is positioned within the vacuum 510 between the external housing 508 and the battery housing 506. In some situations, one or more additional housings can be used to form additional insulative jackets around the battery 500 and/or other components associated with the battery 500. The cooling coil 502 includes an input 512 and an output 514 that extend through the external housing 508 and connect to the other components of the thermal runaway mitigation system 101. The current collectors 120, 122 are each connected to a terminal connection 516, 518 that extend through the housings 506, 508.

For the example discussed with reference to FIG. 5A and FIG. 5B, the battery housing 504 and the external housing 508 have shapes that are generally rectangular prisms with rounded corners. Other shapes can be used in some circumstances. For example, the external housing 508 may be cylindrical in some situations.

During operation, cooling heat transfer fluid 208 is pumped, flowed, or otherwise directed through the input 512 of the cooling coil 502, through the cooling coil 502 and out through the output 514. As discussed above, the cooling heat transfer fluid 208 is pumped into the cooling coil 502 in response to the thermal runaway trigger. The heat from the battery reaction chamber 504 conducts through the battery housing 506, through the wall of the cooling coil 502 and to the cooling heat transfer fluid 208.

In one example, the cooling heat transfer fluid 208 is cycled through the cooling coil in response to the thermal runaway trigger until the electrode material has been sufficiently cooled. In such an example, the cooling heat transfer fluid 208 is pumped through the cooling coil 502, returned to a cooling mechanism (not shown) and again pumped through the input of the cooling coil 502. The cooling heat transfer fluid 208 can be cooled to the ambient temperature or to a temperature below the ambient temperature. A heat exchanger can be used to cool the cooling heat transfer fluid 208.

In another example, the cooling heat transfer fluid 208 is propelled into the cooling coil 502 without continuously cycling and cooling the cooling heat transfer fluid 208. Such a technique may be appropriate where the, heat capacity, temperature, and volume of the cooling heat transfer fluid is sufficient to cool the battery reaction chamber 504 to a safe temperature without re-cooling the cooling heat transfer fluid 208 after it has absorbed the heat from the battery 500. In such a situation, the cooling coil 502 near the battery may be empty or may include a fluid. Where the cooling coil 502 contains a fluid, the fluid is pumped out through the output 514 as the cooling heat transfer fluid 208 is pumped into the cooling coil 502 through the input 512. Where the cooling coil 502 is empty prior to the trigger, a vacuum can be formed within the cooling coil 502 such that when the cooling heat transfer fluid 208 is released into the cooling coil 502 in response to the thermal runaway trigger, the vacuum within the coil sucks the cooling heat transfer fluid into cooling coil 502. As discussed above with reference to FIG. 2, a cooling heat transfer fluid reservoir 210 can be used to store the cooling heat transfer fluid until it is injected into the cooling coil 502.

The planar structure of the reaction chamber 504 typically includes two a planar fluid positive electrode and a planar fluid negative electrode that are separated by a planar solid electrolyte. For the examples of FIG. 5A and FIG. 5C, the fluid negative electrode 104 forms the upper portion of the planar reaction chamber 504 and the fluid positive electrode 106 forms the lower portion of the planar reaction chamber 504. The two electrodes may be reversed in some situations. Also, the battery 500 can be rotated such that both planar electrodes extend vertically relative to Earth during operation.

Figure 6:
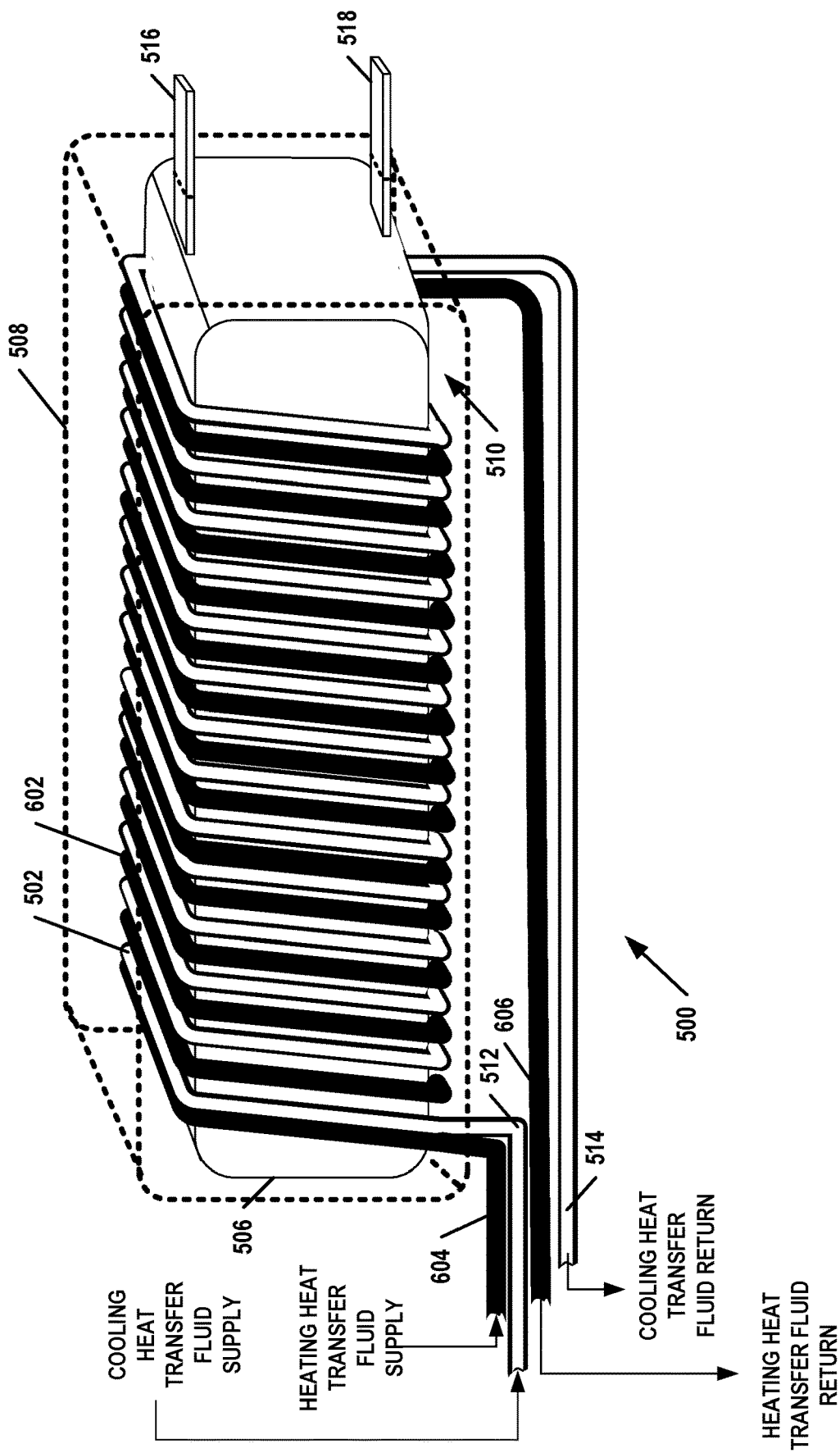
FIG. 6 is an illustration of a perspective view of the battery with a planar structure where the heat transfer element comprises a cooling coil and the heating system comprises a heating coil.

FIG. 6 is an illustration of a perspective view of the battery 500 with a planar structure where the heat transfer element 204 comprises a cooling coil 502 and the heating system 118 comprises a heating coil 602. The cooling coil 502 is shown with solid white fill and the heating coil 602 is shown with a solid black fill in FIG. 6. The cooling coil 502 and battery 500 operate as discussed above. The heating heat transfer fluid is flowed through the heating coil 602 to heat the battery 500 to the operating temperature of the battery 500. The heating coil 602 is tubular coil, tube, pipe or other similar mechanism that is wrapped around the battery housing 506 and facilitates heat transfer from the heating heat transfer fluid, through the wall of the heating coil 602, through the battery housing 506 and to the reaction chamber 504. For the example of FIG. 6, the coils of the heating coil 602 are positioned between the coils of the cooling coil 502. Other arrangements can be used in some circumstances.

During operation, a heater (not shown) heats the heating heat transfer fluid to a sufficiently high temperature. The heating heat transfer fluid is then pumped, or otherwise flowed, through a heating coil input 604 of the heating coil and through the coils of the heating coil 602. The heating heat transfer fluid exits the heating coil output 606 and is directed back to the heater. For the example of FIG. 6, the channels used to convey the heating heat transfer fluid to and from the heating coil 602 are the same as the heating coil 602. In other words, the heating coil is extended through the housing to heater. In some situations, other types of channels can be used. As discussed above, insulation may be useful to minimize heat loss and techniques can be used to increase hear transfer in some situations.

During operation of the battery, therefore, the heating coil 602 heats the reaction chamber to the operating temperature. The controller monitors parameters 216 and applies trigger criteria to determine if a thermal runaway trigger has occurred. In response to determining that a trigger has occurred, the controller 212 disables or otherwise causes the heating coil to stop heating the battery reaction chamber 504 and causes the cooling coil 502 to cool the battery reaction chamber 504. For the examples herein, the cooling coil is separate from heating coil 602. In some situations, however, the same coil can be used to heat and cool the battery 500. For example, heated heat transfer fluid can be flowed through the coil during operation to heat the battery and, in response to a thermal runaway trigger, the heated heat transfer fluid can be replaced with cooling heat transfer fluid. An example of a suitable technique of managing the heat transfer fluids of such systems includes using valves and pumps to divert the appropriate heat transfer fluid though the coil.

Although the descriptions with reference to FIG. 3A, FIG. 3B FIG. 3C, FIG. 4, FIG. 5A, FIG. 5B, and FIG. 6 are directed to cooling the battery reaction chamber, the technique can be applied to other portions of thermal batteries including pumps, valves, plumbing, and reservoirs for managing the electrode material.

Figure 7:
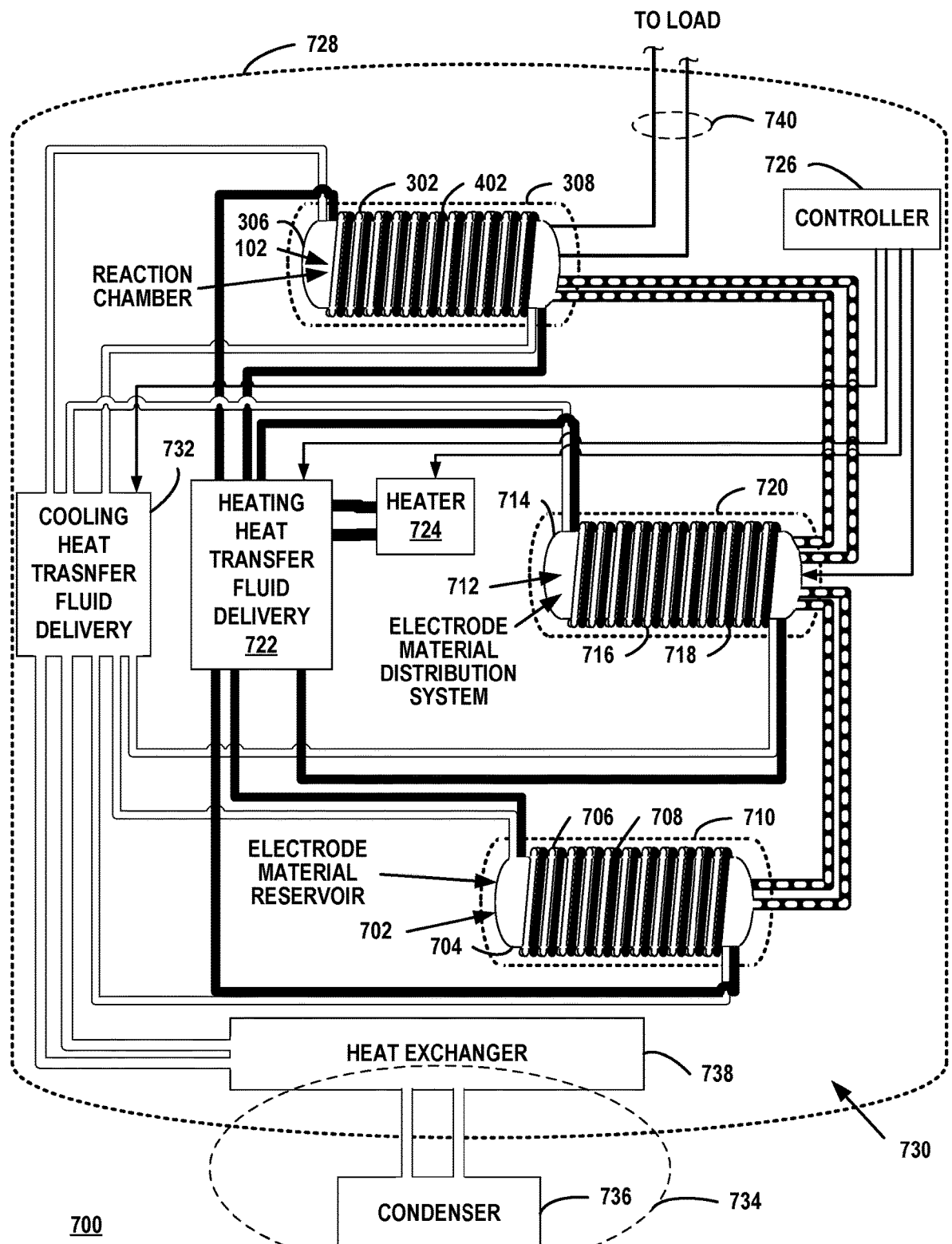
FIG. 7 is an illustration of a high-temperature battery system including a thermal runaway mitigation system for an example where a portion of at least one electrode material is maintained in an electrode material reservoir.

FIG. 7 is an illustration of a high-temperature battery system 700 including a thermal runaway mitigation system 101 for an example where a portion of at least one electrode material is maintained in an electrode material reservoir 702. The illustration in FIG. 7 depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 7 may be implemented in separate structures. Generally, for the example of FIG. 7, a portion of the electrode material is maintained in a reservoir separate from the reaction chamber and an electrode material distribution mechanism moves the fluid electrode material to the reaction chamber as needed. For the example, a portion of the negative electrode material within the battery is maintained in a reservoir 702 in a solid state. The negative electrode material in the reservoir is heated and directed to the reaction chamber 102 when needed. An electrode material distribution mechanism moves the fluid electrode material to the reaction chamber as needed. Such a technique is discussed in detail in U.S. patent application Ser. No. 15/982,497, entitled "DEVICES, SYSTEMS, AND METHODS FOR MOLTEN FLUID ELECTRODE APPARATUS MANAGEMENT", filed concurrently with this application and incorporated by reference in its entirety, herein. For the example of FIG. 7, the reaction chamber, electrode material distribution mechanism, and the electrode material reservoir are each contained in a separate housing and can be independently heated and cooled. Although the housings, cooling coils, and heating coils for each of the components are depicted with similar diagrams of similar size in FIG. 7, the housings may be of different geometries, sizes, and configurations. The configurations, sizes and mechanisms can be used for the heating and cooling systems. Although the example of FIG. 7 discusses selectively heating a portion of a single electrode (i.e., the fluid negative electrode), the techniques discussed with reference to FIG. 7 can be applied to selectively heating both electrode materials. In addition, more than one reservoir for each fluid electrode material can be used to further limit the total amount of electrode material in the fluid state.

For the example of FIG. 7, the reaction chamber 102 is maintained in a battery housing 306 where a cooling coil 302 and a heating coil 402 are wrapped around the battery housing 306 and positioned within a vacuum 310 between the battery housing 306 and external housing 308. The operation of such a reaction chamber with a cooling coil arrangement is discussed above.

An electrode reservoir housing 704 forms a container for holding negative electrode material separately from the electrode materials in the reaction chamber 102. A cooling coil 706 and heating coil 708 are wrapped around the electrode reservoir housing 704 and positioned within a vacuum between the electrode reservoir housing 704 and an external housing 710.

An electrode material delivery system 712 includes components, such as pumps and valves to control the flow of fluid electrode material between the electrode material reservoir 702 and the reaction chamber 102. The electrode material delivery system 712 is contained in an electrode material delivery system housing 714. A cooling coil 716 and heating coil 718 are wrapped around the electrode material delivery housing 714 and positioned within a vacuum between the electrode material delivery housing 714 and an external housing 720. Therefore, the configuration and operation of the housings 704, 714, external housings 710, 720, the heating coils 708, 718 and cooling coils 706, 716 are in accordance with the techniques discussed above with reference to the reaction chamber.

A heating heat transfer fluid delivery mechanism 722 controls the flow of heat transfer fluid between a heater 724 and the heating coils 402, 708, 718. The heating heat transfer fluid delivery mechanism 722 may include any number of pumps and valves where the components can be manipulated and set to direct heat transfer fluid heated by the heater 724 to any or all of the heating coils 402, 708, 718. The heating heat transfer fluid delivery mechanism 722 can also restrict flow to any or all of the heating coils 402, 708, 718. The heater 724 and the heating heat transfer fluid delivery mechanism 722 are responsive to control signals from a controller 726.

The controller 726 is any controller, processor, processor arrangement, set of electronics, circuit or other combination of components that can control the battery components to perform the functions described herein and facilitate the overall operation of the battery system 700. The controller 726 may evaluate inputs from sensors and other equipment to manage operation of the battery system 700 including the heating system, the thermal runaway mitigation system 101 and the electrode material delivery system 712.

Except for a portion of the thermal runaway mitigation system 101, all of the components of the battery system 700 are contained within a system housing 728 in the example. An example of a suitable system housing 728 includes a sealed cylindrical tank or hull having an interior under vacuum 730. The vacuum 730 reduces heat conduction between components and improves insulation of the components. Although the controller 726 can be positioned and/or distributed anywhere within the battery system 700, an example of a suitable location includes the interior of the wall of the system housing 728. Such an arrangement provides protection from the external environment while minimizing heat transfer from other components.

During operation, the heating system 118 maintains the reaction chamber at the appropriate operating temperature by directing heater heat transfer fluid through the heating coil 402. When a load is placed on the battery 700, the controller 726 monitors one or more factors or parameters and determines when the electrode material in the reservoir should be maintained in the fluid state and prepared to be supplied to the reaction chamber 102. The fluid electrode material is directed from the reservoir 704 to the reaction chamber 102 by the electrode material delivery system 712 in response to control signals from the controller 726. During a charging cycle of the battery, the electrode material is pumped back to the reservoir 704. In one example, the fluid negative electrode material is directed back to the reservoir during the charging cycle and the fluid positive electrode material is continually pumped through a closed loop from a positive reservoir to the positive electrode region and back to the reservoir. Such an arrangement may be suitable in a lithium sulfur thermal battery where the lithium ions travel from the negative electrode region, through the solid electrolyte and to the positive electrode region during discharge and in the opposite direction during charging. The lithium electrode material is pumped from the reservoir to the negative electrode region during discharge to replenish the lithium and is pumped back to the reservoir during the charge cycle. Lithium polysulfide products (Li$_n$S$_m$) form in the positive electrode region during discharge increasing the volume of the positive electrode material. Continuous cycling of the fluid positive electrode material between the positive material reservoir and the positive electrode region reduced the concentration of the lithium polysulfide products which improves performance. During charging, as the fluid positive electrode material is cycled through the reservoir, lithium returns to the negative electrode region and the concentration of lithium polysulfide products in the positive electrode material decreases.

For the example of FIG. 7, the controller 726 performs the functions of the controller 212. As discussed above, one or more parameters are evaluated to determine if a thermal runaway trigger has occurred. In response to a trigger, the controller 726 at least provides control signals to the cooling heat transfer fluid delivery mechanism 732 to direct the cooling heat transmitter fluid through the cooling coil 302. For the example, however, the cooling heat transfer fluid is directed to all of the cooling coils 302, 706, 716 to cool the reaction chamber 102, the electrode material reservoir 704, and the electrode material delivery system 712. In addition, the heater 724 is disabled and the heating heat transfer fluid delivery mechanism 722 is controlled to cease directing heated heat transfer fluid to the heating coils 402, 708, 718. In the example, all of the electrode material within the battery is cooled below the melting point of the electrode material to freeze the material in response to detection of a thermal runaway event. In some situations, only some of the fluid electrode material can be cooled and/or frozen.

Although the entire thermal runaway mitigation system 101 can be implemented within the system housing 728, the thermal runaway mitigation system 101 includes a cooling system 734 having a condenser 736 positioned outside of the system housing 728 in the example. The cooling system 734 may include a refrigeration system that includes a condenser 736 implemented outside of the system housing 728, a compressor (not shown), and an evaporator (not shown) within a heat exchanger 738. The cooling heat transfer fluid is flowed through the heat exchanger 738 where it is cooled by the evaporator. The refrigerant is cycled through the heat exchanger where it absorbs heat from the cooling heat transfer fluid and then through the condenser 736 in accordance with refrigeration system techniques. As discussed above, the thermal runaway mitigation system 101 may include an adequate volume of cooling heat transfer fluid to cool the electrode material to a safe temperature without continuously cycling of the cooling heat transfer fluid through a heat exchanger. In such cases, a coolant reservoir may be used to store and maintain the cooling heat transfer fluid at the desired temperature. In other situations, the cooling heat transfer fluid is cycled during the cooling process of the battery components in response to a thermal runaway trigger.

In some circumstances, a heat exchanger can be implemented outside of the system housing 728 without the use of a refrigeration system. For example, the cooling heat transfer fluid can be pumped through a heat exchanger outside of the system housing 728 to cool the heat transfer fluid.

Where wires, tubes, coils, conduits, or other devices extend through the wall of the system housing 728, the system housing 728 includes gas tight seals to maintain the vacuum in the interior. In some situations, it may be cost effective to minimize the number of seals by passing multiple wires, coils, conduits, etc., through the same opening and seal. For example, portions of the cooling system 734, the battery connectors 740, and sensor wires to the controller 726 can be passed through a single opening and seal.

Figure 8A:
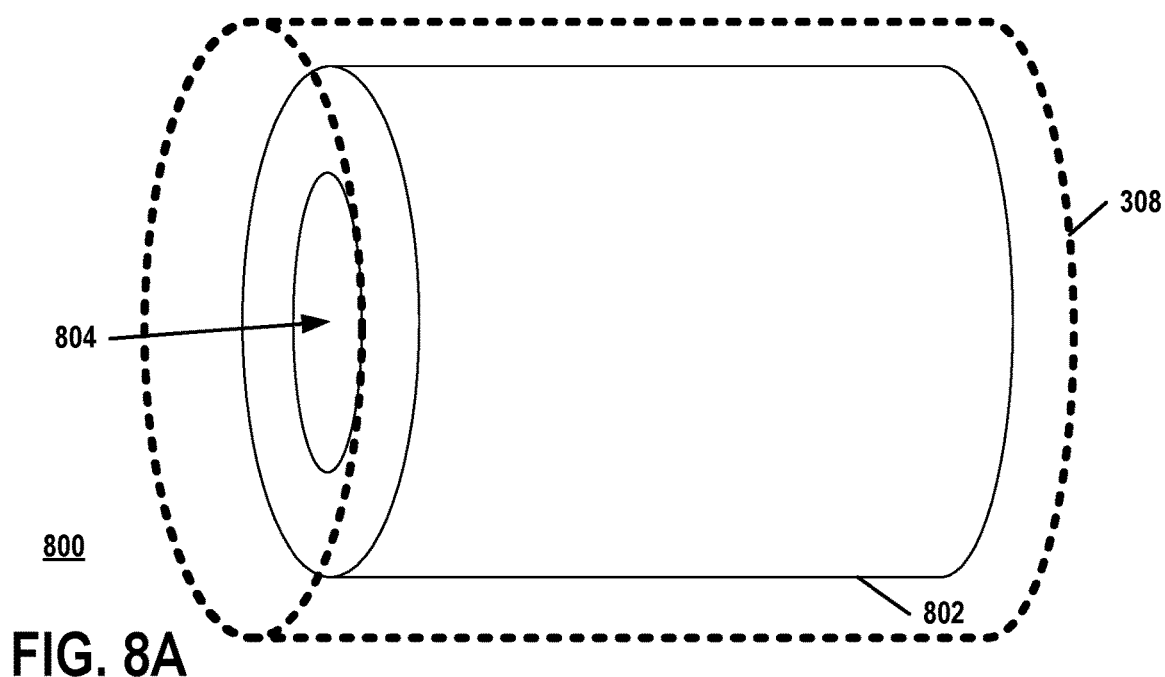
FIG. 8A is an illustration of a perspective view of a battery for an example where the battery housing has a toroidal shape.
Figure 8B:
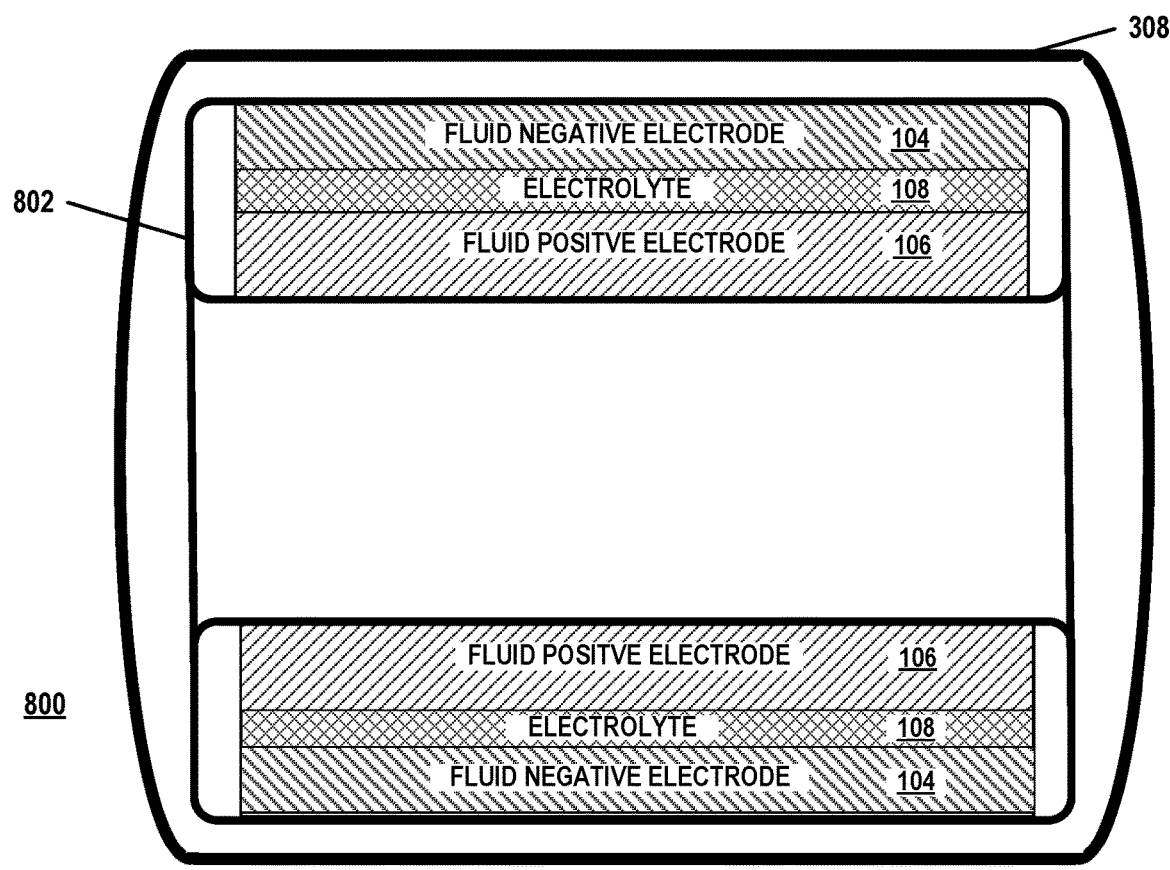
FIG. 8B is an illustration of a cross-sectional front view of the battery for the example where the battery housing has a toroidal shape.
Figure 8C:
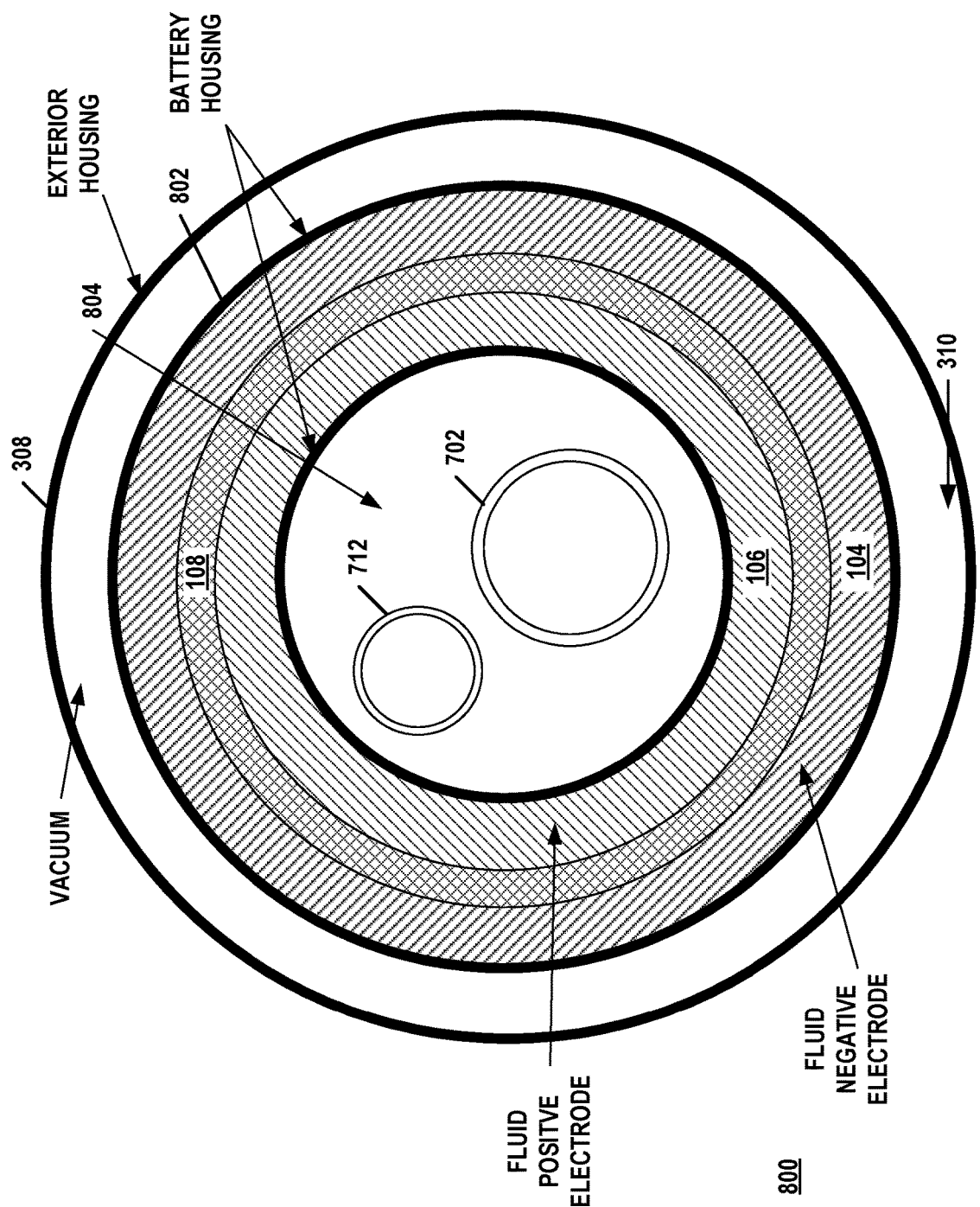
FIG. 8C is an illustration of a cross-sectional front view of the battery for the example where the battery housing has a toroidal shape.

FIG. 8A is an illustration of a perspective view of an example where the battery housing 802 has a toroidal shape. FIG. 8B is an illustration of a cross-sectional side view of the battery 800 and FIG. 8C is an illustration of a cross-sectional front view of the battery 800. The illustrations in FIG. 8A, FIG. 8B, and FIG. 8C depict the general principles of the example, are not necessarily to scale, and do not necessarily represent specific shapes, relative sizes, distances, or other structural details of the represented components. In the interest of clarity, the heating system 118 and the thermal runaway mitigation system are omitted from FIG. 8A, FIG. 8B, and FIG. 8C. In one example, these components can be implemented with cooling coils and heating coils in accordance with the techniques discussed above.

The toroidal structure of the battery housing 802 results in a hollow cylindrical center 804 of the housing 802. Such a shape may provide some beneficial characteristics in some situations. In some circumstances, for example, the battery 800 may have a relatively large diameter increasing the surface area of the interface between the solid electrolyte 108 and the fluid electrodes 104, 106. In addition, the relatively larger structure allows for the positioning of other battery components within the hollow cylindrical center 804. For example, reservoirs 702 and electrode material delivery mechanisms 712 can be positioned within the center 804. Additional heating coils and cooling coils can also be located in the center 804. In the interest of clarity, interconnections between the components within the center 804, as well as interconnections between those components and the reaction chamber are not shown in FIG. 8C. Such an arrangement provides isolation between the reaction chamber 102 and other components and also provides structural protection of the components within the hollow center.

The battery housing 802 is contained within an external housing 308. A vacuum 310 is maintained between the battery housing 802 and the external housing wall in the interior of the external housing 308.

Figure 9:
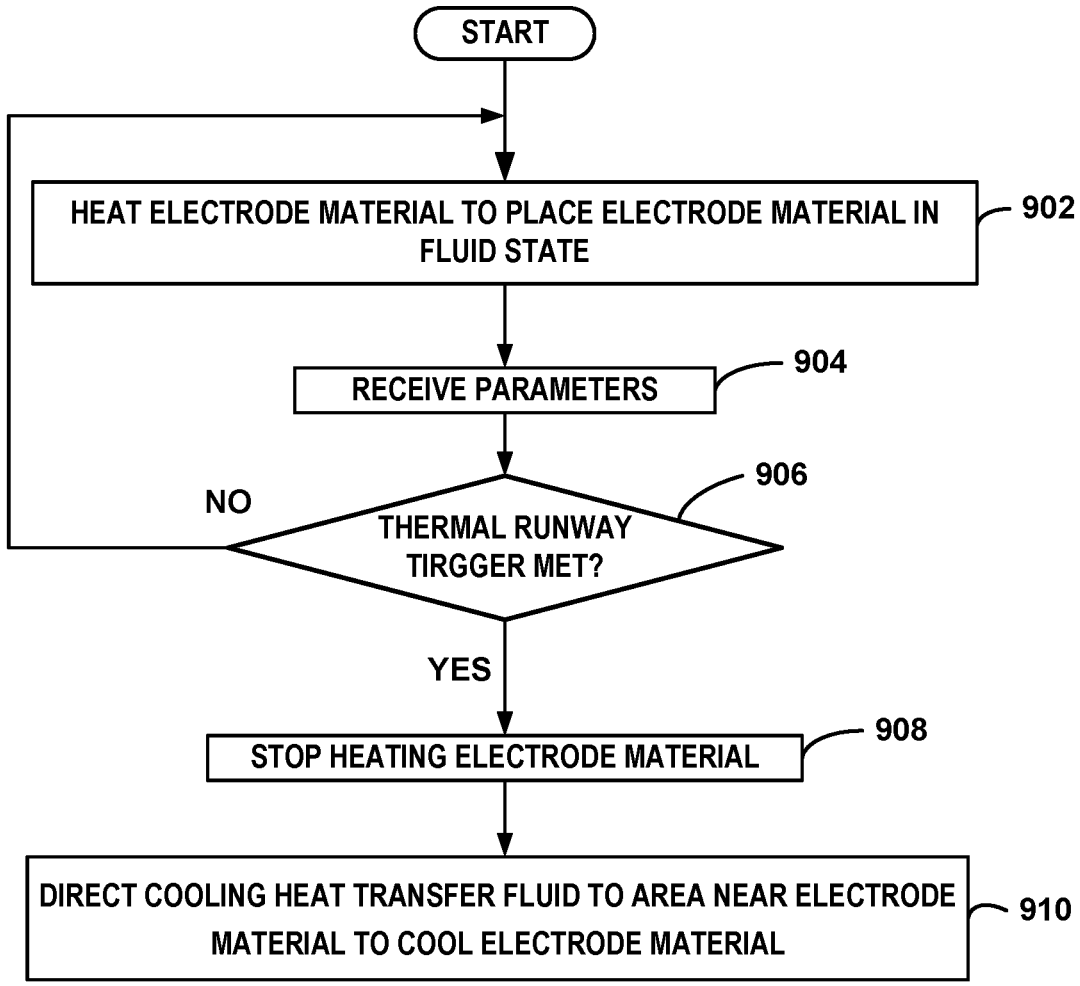
FIG. 9 is a flowchart of an example of a procedure for mitigating thermal runaway in a thermal battery.

FIG. 9 is a flowchart of an example of a procedure for mitigating thermal runaway in a thermal battery. For the example, the procedure is performed by a thermal runaway mitigation system 101 discussed above. The methods may be performed by other devices and systems in some circumstances. The steps of FIG. 9 can be performed in a different order than shown and some steps may be combined into a single step. Additional steps may be performed and some steps may be omitted. For example, the step 908 and step 910 are performed simultaneously in many circumstances.

At step 902, the electrode material is heated to place the electrode material in a fluid state. For the example, all of the electrode material in the reaction chamber of the battery is heated to a temperature within the operating temperature of the battery including the negative electrode material and the positive electrode material. Where the battery is a lithium sulfur thermal battery, the electrode material is heated to a temperature within the range of 375° C. and 425° C.

At step 904, parameters are received. As discussed above, the parameters may comprise any combination of battery operational parameters and environmental parameters comprising parameters from another system, such as a vehicle system. The parameters may be values provided by sensors, parameters that are calculated, and parameters that are provided by other systems. For the example, a controller receives the parameters.

At step 906, it is determined whether a thermal runaway trigger has been met. For the example, the controller evaluates the parameters and applies criteria to determine if one or more thermal runaway triggers have occurred. Any number of parameters and criteria can be evaluated to identify trigger events where a trigger event is any event that indicates the battery is in a thermal runaway condition, is entering a thermal runaway condition, or is above a likelihood threshold to enter a thermal runaway condition. As described above, one basic thermal runaway trigger may include detecting that the temperature of an electrode material has exceeded a threshold. If it is determined that at least one trigger has been met, the procedure continues at step 908. Otherwise, the procedure returns to step 902 where heating of electrode material continues and the battery operates.

At step 908, heating of the electrode material is stopped. For the example, the controller deactivates the heating system 118. Where the heating system 118 comprises an electrical heating coil, electrical current through the electrical heating coil is turned off. In systems where a heating heat transfer fluid flowing through a heating coil with is used to heat the electrode material, the heating heat transfer fluid is stopped from flowing through the heating coil.

At step 910, cooling heat transfer fluid is directed to an area near the electrode material to cool the electrode material. As discussed above, any of numerous techniques can be used to place cooling heat transfer fluid in proximity to the electrode material to cool the electrode material. In one example, a vacuum jacket between the battery housing and the external housing is flooded with cooling heat transfer fluid. In another example, cooling heat transfer fluid is injected or pumped through a cooling coil that is wrapped around the battery housing.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, rather than sequentially or even reversed. In addition, while certain aspects of this disclosure are described as being performed by a single module or component for purposes of clarity, it should be understood that the functions described in this disclosure may be performed by any suitable combination of components or modules associated with a wireless data communication network or system.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An apparatus comprising:
    a fluid electrode material comprising fluid negative electrode material and fluid positive electrode material;
    a reaction chamber comprising a fluid negative electrode formed from at least a portion of the fluid negative electrode material, a fluid positive electrode formed from at least a portion of the fluid positive electrode material, and a solid electrolyte between the fluid negative electrode and the fluid positive electrode;
    a heating system configured to maintain the fluid negative electrode and the fluid positive electrode in a fluid state; and
    a thermal runaway mitigation system configured to, in response to a thermal runaway trigger, cool at least a portion of the fluid electrode material to a temperature below the melting point of the at least the portion of the fluid electrode material to place the at least the portion of fluid electrode material in a solid state.

2. The apparatus of claim 1, wherein the thermal runaway mitigation system is configured to cool at least a portion of the fluid negative electrode material and at least a portion of the fluid positive electrode material.

3. The apparatus of claim 2, wherein the thermal runaway mitigation system is configured to cool at least the portion of the fluid negative electrode material to a negative electrode freezing temperature below the melting point of the at least the portion of fluid negative electrode material and to cool at least the portion of the fluid positive electrode material to a positive electrode freezing temperature below the melting point of the at least the portion of fluid positive electrode material.

4. The apparatus of claim 1, wherein the thermal runaway mitigation system is configured to direct a cooling heat transfer fluid to an area that allows the cooling heat transfer fluid to be thermally conductive with the at least the portion fluid electrode material.

5. The apparatus of claim 4, further comprising a battery housing containing the reaction chamber, the battery housing thermally conductive with the at least the portion of fluid electrode material, wherein the thermal runaway mitigation system is configured to direct the cooling heat transfer fluid to the area to be thermally conductive with the battery housing.

6. The apparatus of claim 5, wherein the thermal runaway mitigation system comprises:
    a heat transfer element thermally conductive with the battery housing; and
    a cooling heat transfer fluid delivery mechanism configured to direct cooling heat transfer fluid to the heat transfer element in response to the thermal runaway trigger.

7. The apparatus of claim 6, wherein the thermal runaway mitigation system further comprises:
    a controller configured to determine the thermal runaway trigger has occurred based on at least one parameter.

8. The apparatus of claim 7, wherein the at least one parameter comprises at least one battery operating parameter.

9. The apparatus of claim 8, wherein the at least one battery operating parameter comprises at least one of a temperature, voltage, current, moisture, pressure, and power output.

10. The apparatus of claim 7, wherein the at least one parameter comprises at least one environmental parameter.

11. The apparatus of claim 10, wherein the at least one environmental parameter comprises at least one of a temperature, moisture, pressure, deacceleration, acceleration, orientation of the battery relative to Earth, and value provided by an external system.

12. The apparatus of claim 6, wherein the heat transfer element comprises a cooling coil thermally conductive with the battery housing, the cooling heat transfer delivery mechanism configured to direct the cooling heat transfer fluid through the heat transfer element in response to the thermal runaway trigger.

13. The apparatus of claim 1, wherein the at least the portion of fluid electrode material is within the reaction chamber.

14. The apparatus of claim 1, wherein the at least the portion of fluid electrode material is outside of the reaction chamber.

15. The apparatus of claim 14, wherein the at least the portion of fluid electrode material is within an electrode material reservoir.

16. The apparatus of claim 14, wherein the at least the portion of fluid electrode material is within a fluid electrode delivery system configured to move fluid electrode material from an electrode material reservoir to the reaction chamber.

17. The apparatus of claim 1, wherein the at least the portion of fluid electrode material comprises all of the fluid electrode material within the apparatus.

18. The apparatus of claim 1, wherein the fluid negative electrode comprises lithium and the fluid positive electrode material comprises sulfur.

19. The apparatus of claim 18, wherein the solid electrolyte comprises lithium iodide.

20. The apparatus of claim 18, wherein the thermal runaway mitigation system is configured to, in response to the thermal runaway trigger, cool at least a portion of the fluid negative electrode to a temperature below (600° F. (315.5° C.).

21. The apparatus of claim 1, wherein the fluid negative electrode comprises sodium and the fluid positive electrode material comprises sulfur.

22. An apparatus comprising:
a heating system configured to heat electrode material of a thermal battery to place the electrode material in a fluid state; and
a thermal runaway mitigation system configured to, in response to a thermal runaway trigger, cool at least a portion of the electrode material to a temperature below the melting point of the at least a portion of electrode material to place the at least a portion of the electrode material in a solid state.

23. The apparatus of claim 22, wherein the electrode material comprises fluid negative electrode material and fluid positive electrode material, the apparatus further comprising:
a reaction chamber comprising a fluid negative electrode formed from at least a portion of the fluid negative electrode material, a fluid positive electrode formed from at least a portion of the fluid positive electrode material, and a solid electrolyte between the fluid negative electrode and the fluid positive electrode.

24. The apparatus of claim 23, wherein the thermal runaway mitigation system is configured to cool at least the portion of the fluid electrode material to a temperature below a combustion temperature where the fluid electrode material is combustible in air.

25. A method comprising:
heating an electrode material to temperature above an electrode material melting point temperature, the electrode material forming a fluid electrode within a thermal battery when heated above the electrode material melting point;
evaluating at least one parameter to determine if a thermal runaway trigger has been met; and
in response to determining the thermal runaway trigger has been met, cooling at least a portion of the electrode material below the electrode material melting point temperature to place the at least a portion of the electrode material in a solid state.

26. The method of claim 25, wherein the at least one parameter comprises at least one battery operating parameter.

27. The method of claim 26, wherein the at least one battery operating parameter comprises at least one of a temperature, voltage, current, moisture, pressure, and power output.

28. The method of claim 25, wherein the at least one parameter comprises at least one environmental parameter.

29. The method of claim 28, wherein the at least one environmental parameter comprises at least one of a temperature, moisture, pressure, deacceleration, acceleration, orientation of the battery relative to Earth, and value provided by an external system.

30. The method of claim 25, wherein the electrode material comprises lithium.

31. An apparatus comprising:
a fluid electrode material comprising fluid negative electrode material and fluid positive electrode material, the fluid negative electrode material comprising Lithium, the fluid positive electrode material comprising Sulfur;
a reaction chamber comprising a fluid negative electrode formed from at least a portion of the fluid negative electrode material, a fluid positive electrode formed from at least a portion of the fluid positive electrode material, and a solid electrolyte between the fluid negative electrode and the fluid positive electrode;
a heating system configured to maintain the fluid negative electrode and the fluid positive electrode in a fluid state; and
a thermal runaway mitigation system configured to, in response to a thermal runaway trigger, cool at least a portion of the fluid electrode material.

32. The apparatus of claim 31, wherein the solid electrolyte comprises lithium iodide.

33. The apparatus of claim 31, wherein the thermal runaway mitigation system is configured to cool at least the portion of the fluid electrode material to a temperature below the melting point of the at least the portion of the fluid electrode material to place the at least the portion of fluid electrode material in a solid state.

34. The apparatus of claim 31, wherein the thermal runaway mitigation system is configured to cool at least a portion of the fluid negative electrode material and at least a portion of the fluid positive electrode material.

35. The apparatus of claim 34, wherein the thermal runaway mitigation system is configured to cool at least the portion of the fluid negative electrode material to a negative electrode freezing temperature below the melting point of the at least the portion of fluid negative electrode material and to cool at least the portion of the fluid positive electrode material to a positive electrode freezing temperature below the melting point of the at least the portion of fluid positive electrode material.

36. The apparatus of claim 31, wherein the thermal runaway mitigation system is configured to direct a cooling heat transfer fluid to an area that allows the cooling heat transfer fluid to be thermally conductive with the at least the portion fluid electrode material.

37. The apparatus of claim 36, further comprising a battery housing containing the reaction chamber, the battery housing thermally conductive with the at least the portion of fluid electrode material, wherein the thermal runaway mitigation system is configured to direct the cooling heat transfer fluid to the area to be thermally conductive with the battery housing.

38. The apparatus of claim 37, wherein the thermal runaway mitigation system comprises:
  a heat transfer element thermally conductive with the battery housing; and
  a cooling heat transfer fluid delivery mechanism configured to direct cooling heat transfer fluid to the heat transfer element in response to the thermal runaway trigger.

39. The apparatus of claim 38, wherein the thermal runaway mitigation system further comprises:
  a controller configured to determine the thermal runaway trigger has occurred based on at least one parameter.

40. The apparatus of claim 39, wherein the at least one parameter comprises at least one battery operating parameter.

41. The apparatus of claim 40, wherein the at least one battery operating parameter comprises at least one of a temperature, voltage, current, moisture, pressure, and power output.

42. The apparatus of claim 39, wherein the at least one parameter comprises at least one environmental parameter.

43. The apparatus of claim 42, wherein the at least one environmental parameter comprises at least one of a temperature, moisture, pressure, deacceleration, acceleration, orientation of the battery relative to Earth, and value provided by an external system.

44. The apparatus of claim 38, wherein the heat transfer element comprises a cooling coil thermally conductive with the battery housing, the cooling heat transfer delivery mechanism configured to direct the cooling heat transfer fluid through the heat transfer element in response to the thermal runaway trigger.

45. The apparatus of claim 31, wherein the at least the portion of fluid electrode material is within the reaction chamber.

46. The apparatus of claim 31, wherein the at least the portion of fluid electrode material is outside of the reaction chamber.

47. The apparatus of claim 46, wherein the at least the portion of fluid electrode material is within an electrode material reservoir.

48. The apparatus of claim 46, wherein the at least the portion of fluid electrode material is within a fluid electrode delivery system configured to move fluid electrode material from an electrode material reservoir to the reaction chamber.

49. The apparatus of claim 31, wherein the at least the portion of fluid electrode material comprises all of the fluid electrode material within the apparatus.

50. The apparatus of claim 31, wherein the thermal runaway mitigation system is configured to, in response to the thermal runaway trigger, cool at least a portion of the fluid negative electrode to a temperature below 600° F. (315.5° C.).

* * * * *